United States Patent
Doi et al.

(10) Patent No.: US 10,608,318 B2
(45) Date of Patent: Mar. 31, 2020

(54) GLASS ANTENNA

(71) Applicant: NIPPON SHEET GLASS COMPANY, LIMITED, Tokyo (JP)

(72) Inventors: Ryokichi Doi, Tokyo (JP); Tatsumi Tokuda, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 0 days.

(21) Appl. No.: 16/592,475

(22) Filed: Oct. 3, 2019

(65) Prior Publication Data

US 2020/0036079 A1 Jan. 30, 2020

Related U.S. Application Data

(63) Continuation of application No. 15/567,677, filed as application No. PCT/JP2016/063461 on Apr. 28, 2016.

(30) Foreign Application Priority Data

Apr. 28, 2015 (JP) .................................. 2015-092326
Sep. 16, 2015 (JP) .................................. 2015-183499

(51) Int. Cl.
*H01Q 1/02* (2006.01)
*H01Q 1/12* (2006.01)
*B60K 6/22* (2007.10)
*H01Q 1/32* (2006.01)
*H05B 3/86* (2006.01)
(Continued)

(52) U.S. Cl.
CPC ............. *H01Q 1/1278* (2013.01); *B60K 6/22* (2013.01); *H01Q 1/02* (2013.01); *H01Q 1/1285* (2013.01); *H01Q 1/325* (2013.01); *H04B 1/082* (2013.01); *H05B 3/86* (2013.01); *B60L 2270/147* (2013.01); *B60S 1/026* (2013.01); *B60Y 2200/92* (2013.01); *Y10S 903/904* (2013.01)

(58) Field of Classification Search
CPC ............... H01Q 1/12; H01Q 1/02; H01Q 1/32
USPC ....................................................... 343/713
See application file for complete search history.

(56) References Cited

U.S. PATENT DOCUMENTS 4,063,247 A 12/1977 Sakurai et al.
6,072,435 A 6/2000 Terashima et al.
(Continued)

FOREIGN PATENT DOCUMENTS

EP 0856904 A2 8/1998
EP 1643587 A1 4/2006
(Continued)

OTHER PUBLICATIONS

Extended European Search Report for European Application No. 16786590.6, dated Oct. 29, 2018.
(Continued)

*Primary Examiner* — Andrea Lindgren Baltzell
(74) *Attorney, Agent, or Firm* — Birch, Stewart, Kolasch & Birch, LLP

(57) ABSTRACT

A glass antenna with improved reception sensitivity was provided. A glass antenna formed on a surface of a window of a motor vehicle includes: an FM antenna element; and a heater that is capacitively coupled to the FM antenna element, and includes a plurality of heating wires, wherein a distance S between the FM antenna element and the heater is more than 40 mm.

10 Claims, 26 Drawing Sheets

(51) Int. Cl.
    *H04B 1/08*         (2006.01)
    *B60S 1/02*         (2006.01)

(56) References Cited

U.S. PATENT DOCUMENTS

| | | | |
|---|---|---|---|
| 6,243,043 B1 * | 6/2001 | Terashima | H01Q 1/1271 343/713 |
| 2005/0140555 A1 | 6/2005 | Fujii et al. | |
| 2006/0077109 A1 | 4/2006 | Baba et al. | |

FOREIGN PATENT DOCUMENTS

| | | |
|---|---|---|
| JP | 2005/130415 A | 5/2005 |
| JP | 2010-4332 A | 1/2010 |
| JP | 2011-49825 A | 3/2011 |
| JP | 2012-66658 A | 4/2012 |

OTHER PUBLICATIONS

International Search Report for PCT/JP2016/063461 dated May 31, 2016.
Japanese Office Action for counterpart Japanese Application No. 2017-515625, dated Aug. 6, 2019, with English translation.
Written Opinion of the International Searching Authority for PCT/JP2016/063461 dated May 31, 2016.

\* cited by examiner (a)

(by)

(c)

GLASS ANTENNA

CROSS-REFERENCE TO RELATED APPLICATIONS

This application is a Continuation of copending application Ser. No. 15/567,677, filed on Oct. 19, 2017, which was filed as PCT International Application No. PCT/JP2016/063461 on Apr. 28, 2016, which claims the benefit under 35 U.S.C. § 119(a) to Patent Application No. 2015-092326, filed in Japan on Apr. 28, 2015 and Patent Application No. 2015-183499, filed in Japan on Sep. 16, 2015, all of which are hereby expressly incorporated by reference into the present application.

TECHNICAL FIELD

The present invention relates to a glass antenna formed on the surface of a window of a motor vehicle.

BACKGROUND ART

Glass antennas that have an antenna pattern formed on the rear window of a vehicle have become widely used for reasons including being more aesthetic than a conventional glass antenna in terms of design due to a lack of protrusions, no danger of it being broken, and because it does not generate wind noise.

Various types of such glass antennas have been proposed. For example, one in which a defogger is also used as an antenna by capacitively coupling an FM antenna element of a glass antenna to a defogger provided on the rear window.

CITATION LIST

Patent Literature

Patent Literature 1: JP 2010-4332A

SUMMARY OF INVENTION

Technical Problem

However, there is still room for improvement in the sensitivity characteristics of the antenna, and further improvements are desired. The present invention was realized to solve the above-described problems, and it is an object of the present invention to provide a glass antenna with improved reception sensitivity.

Solution to Problem

<Invention 1>
1. A glass antenna formed on a surface of a window of a motor vehicle, the glass antenna comprising:
an FM antenna element; and
a heater that is capacitively coupled to the FM antenna element, and includes a plurality of heating wires,
wherein a distance S between the FM antenna element and the heater is more than 40 mm.
2. The glass antenna according to 1., wherein the distance S is 50 mm or more.
3. The glass antenna according to 1. or 2., wherein the motor vehicle is a hybrid vehicle having an internal combustion engine and an electric motor as drive sources, a DC-DC converter that converts a voltage of a battery for the electric motor into a voltage suitable for the electric motor is located in a rear part of the motor vehicle, and a central frequency F of noise generated by driving the DC-DC converter satisfies 76 MHz≤F±7 MHz≤108 MHz.

The FM antenna element as described in Patent Literature 1 may receive various kinds of noise, and therefore improvements regarding noise reduction have also been in demand. For example, hybrid vehicles that have become widely used in recent years use a DC-DC converter in order to supply a voltage dropped from a driving battery to an auxiliary battery. This DC-DC converter has been pointed out as a source of noise. There has also been demand to block or reduce the influence of other types of noise on the FM antenna element. Inventions 2 to 5 described below were realized in order to solve these problems, and specifically provide inventions of the following aspects.

<Invention 2>
1. A hybrid vehicle having an internal combustion engine and an electric motor as drive sources and comprising a driving battery for the electric motor, an auxiliary battery, and a DC-DC converter that converts a voltage of the driving battery into a voltage suitable for the auxiliary battery, the DC-DC converter being located in a rear part of the motor vehicle, and a central frequency F of noise generated by driving the DC-DC converter satisfying 76 MHz≤F±7 MHz≤108 MHz, the hybrid vehicle comprising:
a rear window; and
a glass antenna formed on a surface of the rear window,
wherein the glass antenna includes:
an FM antenna element; and
a heater that is capacitively coupled to the FM antenna element, and includes a plurality of heating wires,
the heater includes an anode bus bar connected to the auxiliary battery and supplies power to the heater, and a cathode bus bar connected to a vehicle ground,
a noise filter for the FM antenna element is provided between the auxiliary battery and the anode bus bar, the noise filter including a coil element, and
no noise filter is provided between the cathode bus bar and the vehicle ground.
2. The hybrid vehicle according to 1., wherein on the surface of the rear window, a power supplying terminal for supplying power to the FM antenna element is located on a cathode bus bar side.
<Invention 3>
1. A glass antenna formed on a surface of a window of a motor vehicle, the glass antenna comprising:
an FM antenna element;
a heater that is capacitively coupled to the FM antenna element, and includes a plurality of heating wires; and
a plurality of noise rejection elements located between the FM antenna element and the heater, and including at least a horizontal element extending in a horizontal direction,
wherein the plurality of noise rejection elements are arranged along the horizontal direction at a predetermined spacing.
2. The glass antenna according to 1., wherein the plurality of noise rejection elements are each connected to a vehicle ground.
3. The glass antenna according to 1. or 2., wherein the window is a rear window,
the motor vehicle is a hybrid vehicle having an internal combustion engine and an electric motor as drive sources, and includes a driving battery for the electric motor, an auxiliary battery, and a DC-DC converter that converts a voltage of the driving battery into a voltage suitable for the auxiliary battery, the DC-DC converter is located in a rear part of the motor vehicle, and a central frequency F of noise generated by driving the DC-DC converter satisfies 76 MHz≤F±7 MHz≤108 MHz.

<Invention 4>

1. A glass antenna formed on a surface of a window of a motor vehicle, the glass antenna comprising:

an FM antenna element;

an AM antenna element; and a parallel resonance circuit that is formed by a pattern of an antenna wire connected to the AM antenna element, allows passage of a received signal in an AM broadcast frequency band, and blocks or attenuates a received signal in an FM broadcast frequency band.

2. The glass antenna according to 1., wherein the parallel resonance circuit is formed by folding back the antenna wire at at least one position.

3. The glass antenna according to 1., wherein the parallel resonance circuit is formed by folding back the antenna wire at at least two positions.

4. The glass antenna according to any of 1. to 3., further comprising a heater that is capacitively coupled to the FM antenna element, and includes a plurality of heating wires, wherein the AM antenna element is located between the FM antenna element and the heater.

5. The glass antenna according to 2., wherein a distance S between the FM antenna element and the heater is more than 40 mm.

6. The glass antenna according to 5., wherein the distance S is 50 mm or more.

7. The glass antenna according to any of 1. to 5., wherein the window is a rear window, the motor vehicle is a hybrid vehicle having an internal combustion engine and an electric motor as drive sources, and includes a driving battery for the electric motor, an auxiliary battery, and a DC-DC converter that converts a voltage of the driving battery into a voltage suitable for the auxiliary battery, the DC-DC converter is located in a rear part of the motor vehicle, and a central frequency F of noise generated by driving the DC-DC converter satisfies 76 MHz≤F±7 MHz≤108 MHz.

<Invention 5>

1. A glass antenna formed on a surface of a window of a motor vehicle including a device that transmits a radio wave in an FM band, the glass antenna comprising:

an FM antenna reception unit including: an FM antenna element; and a heater including a plurality of horizontal heating wires extending in a horizontal direction and at least one vertical element extending in a vertical direction; and a noise suppression element located on a side of the heater opposite to the FM antenna element, and affecting noise from the device.

The "device that transmits a radio wave in an FM band" is, for example, a DC-DC converter in a hybrid vehicle, although the device is not limited to this as long as it produces noise upon receiving an FM broadcast wave.

2. The glass antenna according to 1., wherein the heater and the noise suppression element are capacitively coupled.

3. The glass antenna according to 1. or 2., wherein the noise suppression element is connected to a vehicle ground of the motor vehicle.

4. The glass antenna according to any of 1. to 3., wherein the heater includes an anode bus bar connected to an auxiliary battery and supplying power to the heater, and a cathode bus bar connected to a vehicle ground, and a noise filter for the FM antenna element is provided between the auxiliary battery and the anode bus bar and between the cathode bus bar and the vehicle ground, the noise filter including a coil element.

5. The glass antenna according to any of 1. to 3., wherein the heater includes an anode bus bar connected to an auxiliary battery and supplying power to the heater, and a cathode bus bar connected to a vehicle ground, a noise filter for the FM antenna element is provided between the auxiliary battery and the anode bus bar, the noise filter including a coil element, and no noise filter is provided between the cathode bus bar and the vehicle ground.

Advantageous Effects of Invention

A glass antenna according to the present invention has improved reception sensitivity.

DESCRIPTION OF EMBODIMENTS

A. Embodiment 1

Figure 1:
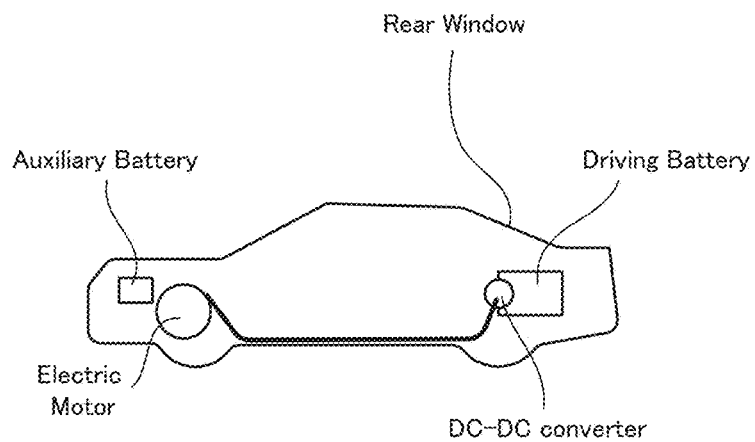
FIG. 1 is a schematic diagram of a hybrid vehicle on which Embodiment 1 of a glass antenna according to the present invention is mounted.
Figure 2:
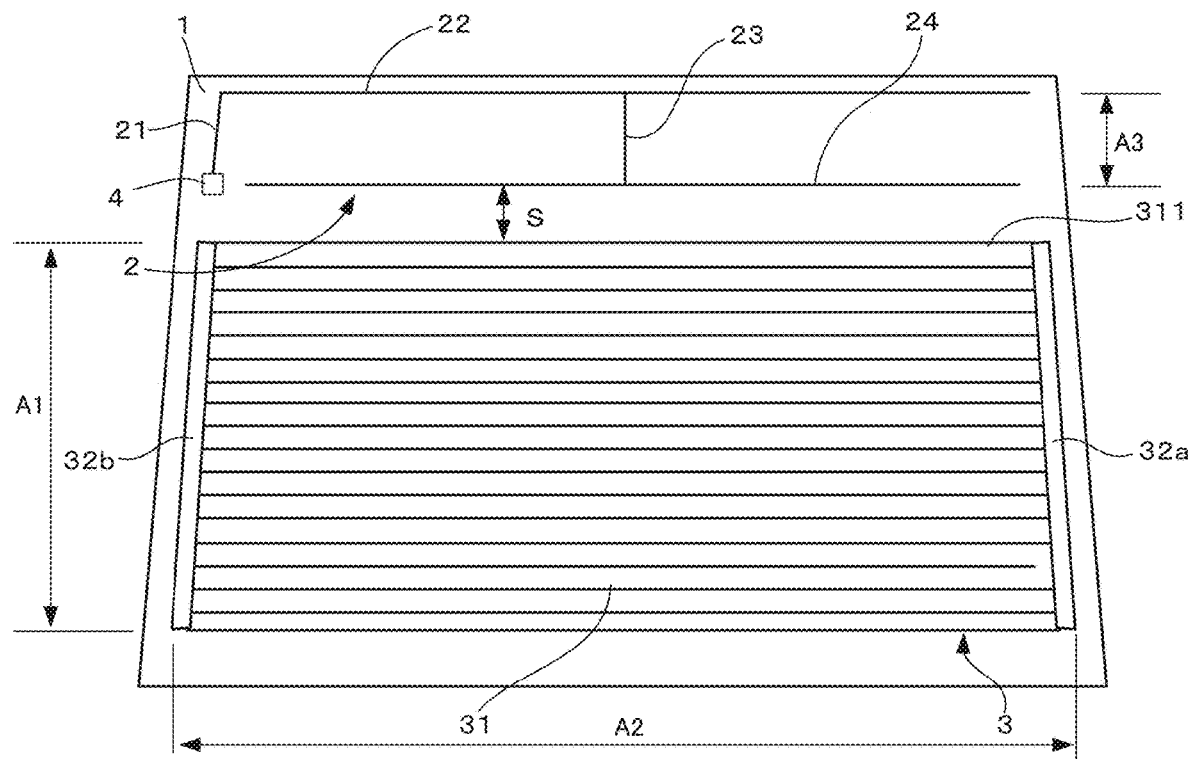
FIG. 2 is a front view of the rear window of the hybrid vehicle in FIG. 1.

The following describes Embodiment 1 of a glass antenna according to Invention 1, with reference to the drawings. The glass antenna in this embodiment is mounted on the rear window of a hybrid vehicle. FIG. 1 is a schematic view of the hybrid vehicle on which the glass antenna in this embodiment is mounted. FIG. 2 is a front view of the rear window of the hybrid vehicle in FIG. 1.

1. Overview of Hybrid Vehicle

An overview of the hybrid vehicle on which the glass antenna in this embodiment is mounted is given first. As illustrated in FIG. 1, the hybrid vehicle has an engine and an electric motor as drive sources. A driving battery for an electric motor is located in a rear part of the vehicle, i.e. near the trunk. An auxiliary battery for an in-vehicle device such as an ECU or ABS is located in a front part of the vehicle. A DC-DC converter is located near the trunk. The DC-DC converter converts high DC high voltages of the driving battery into a low DC voltage (e.g. 12 V) suitable for the auxiliary battery, and supplies the voltage to the auxiliary battery.

It is known that driving the DC-DC converter generates radiation noise. The central frequency F (MHz) of the noise satisfies the following expression (1):

$$76\ \text{MHz} \leq F \pm 7\ \text{MHz} \leq 108\ \text{MHz} \tag{1}$$

2. Overview of Glass Antenna

The glass antenna is described next. As illustrated in FIG. 2, the glass antenna in this embodiment is located on a rear window 1 of the hybrid vehicle, and includes an FM antenna element 2 and a defogger 3 (heater).

A power supplying terminal 4 is provided on the upper side with respect to the center of the left edge of the rear window 1. The FM antenna element 2 is connected to the power supplying terminal 4. The FM antenna element 2 includes a first vertical element 21 extending upward from the power supplying terminal 4, and a first horizontal element 22 extending in the horizontal direction from the upper end of the first vertical element 21. The first vertical element 21 extends to the vicinity of the upper end of the rear window 1, and the first horizontal element 22 extends in the horizontal direction along the upper end of the rear window 1. The FM antenna element 2 also includes a second vertical element 23 extending downward from the center of the first horizontal element 22, and a second horizontal element 24 connected to the lower end of the second vertical element 23 and extending in the horizontal direction. The lower end of the second vertical element 24 is approximately at the same vertical position as the power supplying terminal 4. The second horizontal element 24 connected to the second vertical element 23 forms the bottom portion of the FM antenna element 2.

Here, "horizontal" means a direction approximately parallel to the mounting surface of the vehicle, and "vertical" means a direction approximately orthogonal to "horizontal". Thus, "horizontal" and "vertical" do not necessarily denote exact directions. For example, "horizontal" may not be exactly parallel to the mounting surface of the vehicle, and may be slightly inclined from the mounting surface of the vehicle. These meanings of "horizontal" and "vertical" also apply to the below-mentioned defogger and subsequent embodiments.

The following describes the defogger 3. The defogger 3 is mounted below the second horizontal element 24 of the FM antenna element 2, and includes a plurality of horizontal elements (heating wires) 31. First, the defogger 3 includes a pair of power supplying bus bars 32a and 32b extending in the vertical direction along both side edges of the rear window 1. The right bus bar 32a is supplied with power from an auxiliary battery (not illustrated), and the left bus bar 32b is connected to the vehicle ground (not illustrated). The plurality of horizontal elements 31 are arranged in parallel at a predetermined spacing between the bus bars 32a and 32b, and generate heat for defogging using power supplied from the bus bars 32a and 32b. A horizontal element 311, which is the top portion of the defogger 3, and the second horizontal element 24, which is the bottom portion of the FM antenna element 2, are approximately parallel to each other, and thus the elements 311 and 24 are capacitively coupled. Hence, the defogger 5 not only has a defogging function, but also functions as an antenna together with the FM antenna element 2.

The distance S between the horizontal element 311 of the defogger and the second horizontal element 24 of the FM antenna element 2 is preferably more than 40 mm, further preferably 50 mm or more, and particularly preferably 60 mm or more.

Each antenna element described above is made of a known conductive material, and mounted on the glass surface using screen printing or the like.

3. Features

The glass antenna having the structure described above has the following effects. A hybrid vehicle such as the one described above is provided with a DC-DC converter, and driving the DC-DC converter generates radiation noise. Since the DC-DC converter is situated in the rear part of the vehicle near the rear window, the generated radiation noise affects the defogger 3, which has a large surface area. However, the distance S between the defogger 3 and the FM antenna element 2 is more than 40 mm as stated above, and thus the influence of noise, which affects the defogger 3, on the FM antenna element 2 can be reduced.

The inventors discovered that, when the distance S between the defogger 3 and the FM antenna element 2 is more than 40 mm, not only noise in the FM antenna element 2 is reduced, but also the reception sensitivity of the FM antenna element 2 is improved. That is to say, while the reception sensitivity increases in the whole FM radio wave frequency band as the distance S increases, the reception sensitivity in the overseas frequency band of 88 to 108 MHz is improved particularly when the distance S is more than 40 mm. Such improvement in reception sensitivity is achieved not only in a hybrid vehicle including a DC-DC converter but also in an ordinary engine-driven vehicle, by increasing the distance S.

4. Modifications

While the embodiment according to Invention 1 has been described above, the present invention is not limited to the above embodiment, and various changes can be made without departing from the scope of the invention. The following modifications may be combined as appropriate.

<4-1>

The shape of the FM antenna element and the shape of the defogger 3 in the above embodiment are examples, and various other shapes may be used as long as at least the distance S between the FM antenna element 2 and the defogger 3 is more than 40 mm and the FM antenna element 2 and the defogger 3 are capacitively coupled. For example, another element may be added to the FM antenna element 2, and a vertical element may be added to the defogger 3 as appropriate.

<4-2>

Although the rear window in the above embodiment is provided only with the FM antenna element as an antenna element, there is no limit to this, and the rear window may be provided with an FM sub antenna element, an AM antenna element, a key antenna element for keyless entry, or the like as appropriate. The same applies to the subsequent embodiments.

<4-3>

The hybrid vehicle described in the above embodiment is an example, and the present invention is not limited to such. The glass antenna in the above embodiment is applicable to not only hybrid vehicles but also to other vehicles. In other words, the glass antenna in the above embodiment is applicable to various sources of noise. The same applies to the subsequent embodiments.

5. Example A

Example A is described below. Example A is merely an example, and does not limit Invention 1.

The following examples and comparative examples each with a different distance S in a glass antenna with the FM antenna element and defogger of the pattern illustrated in FIG. 2 were prepared. These glass antennas were provided on a hybrid vehicle having a DC-DC converter in its rear part as illustrated in FIG. 1. The central frequency of radiation noise generated in the DC-DC converter was 76 MHz. The dimensions of the parts of the glass antenna illustrated in FIG. 2 are as follows:

A1=480 mm
A2=1147 mm
A3=120 mm

The same dimensions apply to the below-mentioned Examples B to G unless otherwise noted.

TABLE 1

| | Example 1 | Example 2 | Comparative Example 1 | Comparative Example 2 | Comparative Example 3 | Comparative Example 4 |
|---|---|---|---|---|---|---|
| Distance S | 50 mm | 60 mm | 10 mm | 20 mm | 30 mm | 40 mm |

The above-mentioned examples and comparative examples each attached to a hybrid vehicle were prepared. Noise and sensitivity were measured while FM radio waves radiated to the vehicle. The measurement conditions are as follows:

the glass mounting angle of the glass antenna: inclined by 23 degrees with respect to the horizontal direction the angular resolution: measured with the motor vehicle being rotated 360 degrees at each 3-degree angle the frequency resolution: measured per 1 MHz in the range of 76 to 108 MHz the elevation angle between the radio wave transmission position and the antenna: 1.7 degrees (the direction horizontal to the ground being at 0 degrees, and the zenith direction being at 90 degrees)

The same conditions apply to the below-mentioned Examples B to G unless otherwise noted.

Figure 3:
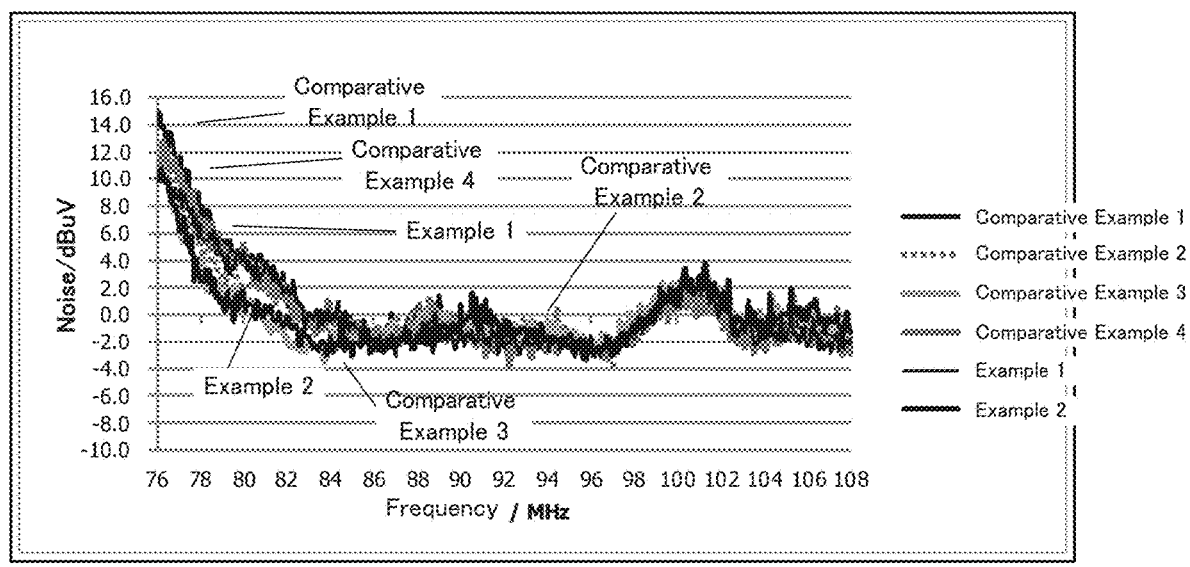
FIG. 3 is a graph illustrating noise in the whole FM frequency band in Examples 1 and 2 and Comparative Examples 1 to 4.
Figure 4:
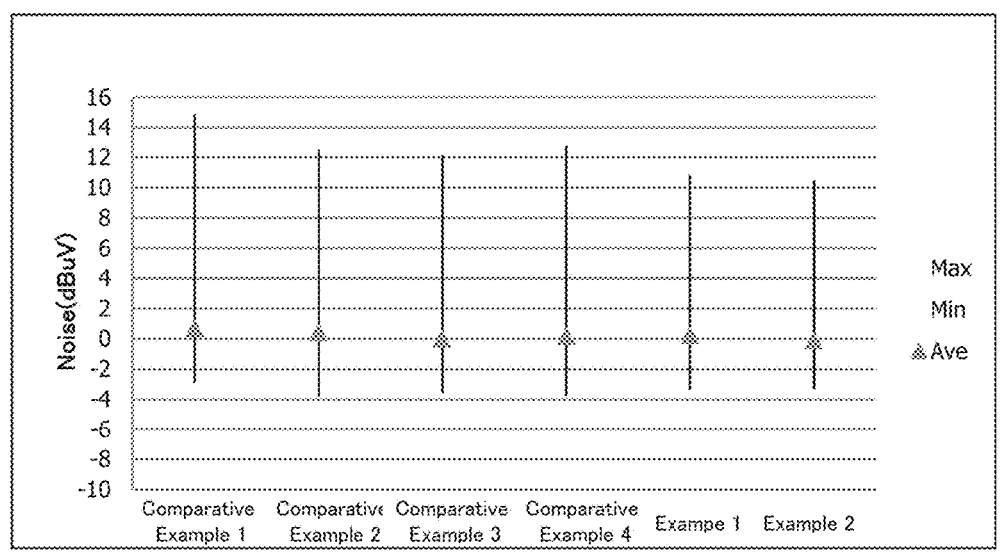
FIG. 4 is a graph illustrating the distribution of noise in a domestic FM frequency band in Examples 1 and 2 and Comparative Examples 1 to 4.

FIG. 3 illustrates the results regarding noise. As illustrated in FIG. 3, it can appreciated that, with 76 MHz as the central frequency F of noise of the DC-DC converter, the reduction in noise increased as the distance S increased. The noise in the domestic frequency band of 76 to 90 MHz was extracted from FIG. 3, and FIG. 4 illustrates the range and average of noise in each of the examples and comparative examples in this frequency band. As illustrated in FIG. 4, when the distance S was more than 40 mm, the maximum value of noise decreased. This tendency is seen up to near 83 MHz. Given the difference of 7 MHz from the central frequency F, it is significant to set the distance S to more than 40 mm according to the present invention for such noise whose central frequency F satisfies the foregoing expression (1).

Figure 5:
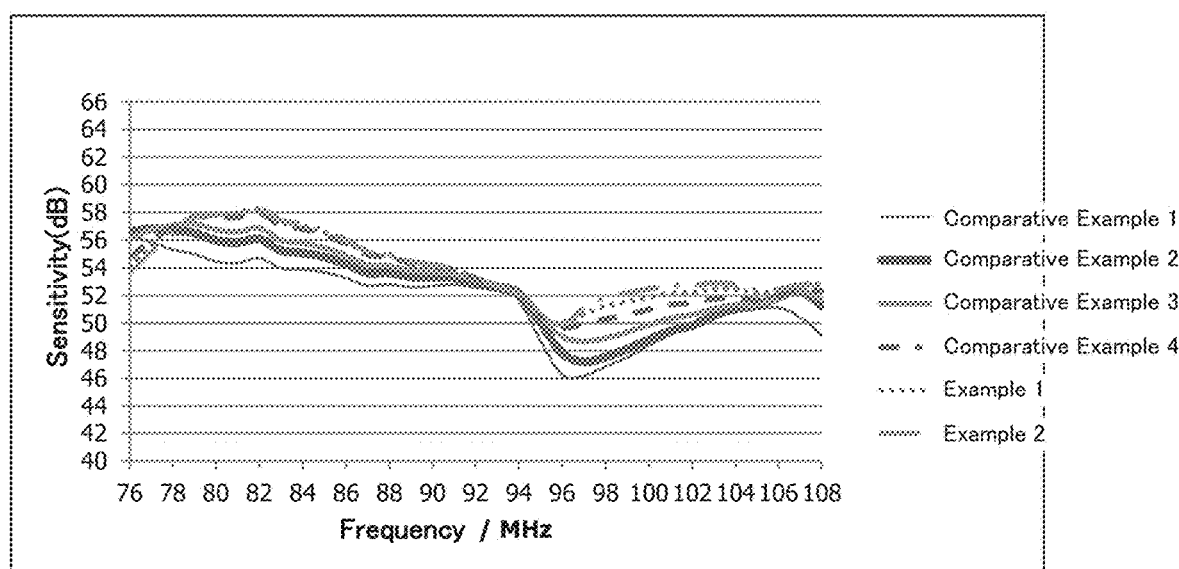
FIG. 5 is a graph illustrating reception sensitivity in the whole FM frequency band in Examples 1 and 2 and Comparative Examples 1 to 4.
Figure 6:
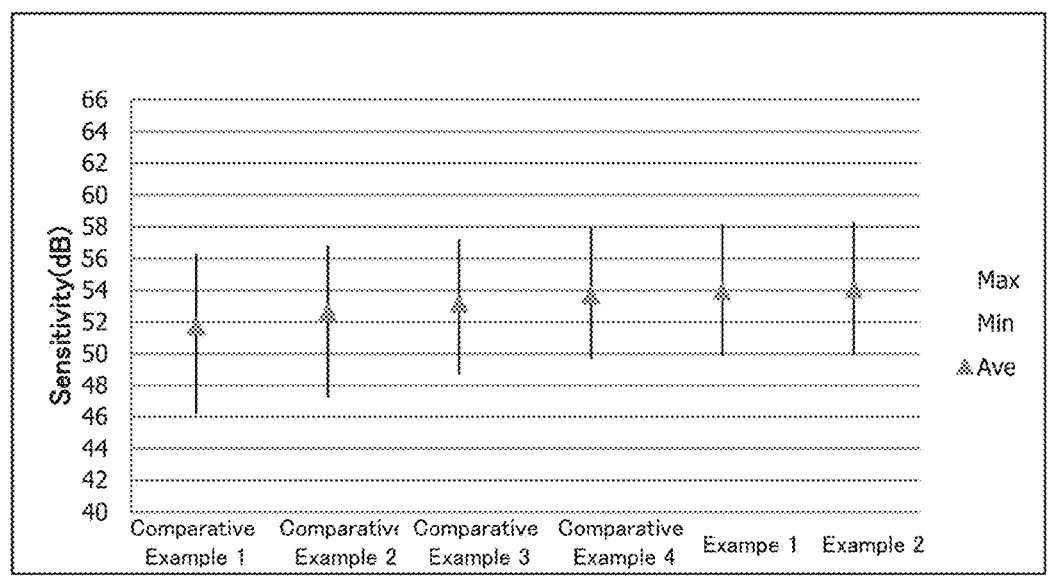
FIG. 6 is a graph illustrating the distribution of reception sensitivity in the whole FM frequency band in Examples 1 and 2 and Comparative Examples 1 to 4.

The FM radio wave reception sensitivity was then examined. FIG. 5 illustrates the reception sensitivity in the whole frequency band. FIG. 6 illustrates the range and average of reception sensitivity in each of the examples and comparative examples, based on FIG. 5. As illustrated in FIGS. 5 and 6, the reception sensitivity was improved when the distance S was increased. In particular, when the distance S was more than 40 mm, the reception sensitivity in the overseas frequency band of 88 to 108 MHz was improved. Thus, the average reception sensitivity in the whole frequency band increased as the distance S increased.

B. Embodiment 2

Figure 7:
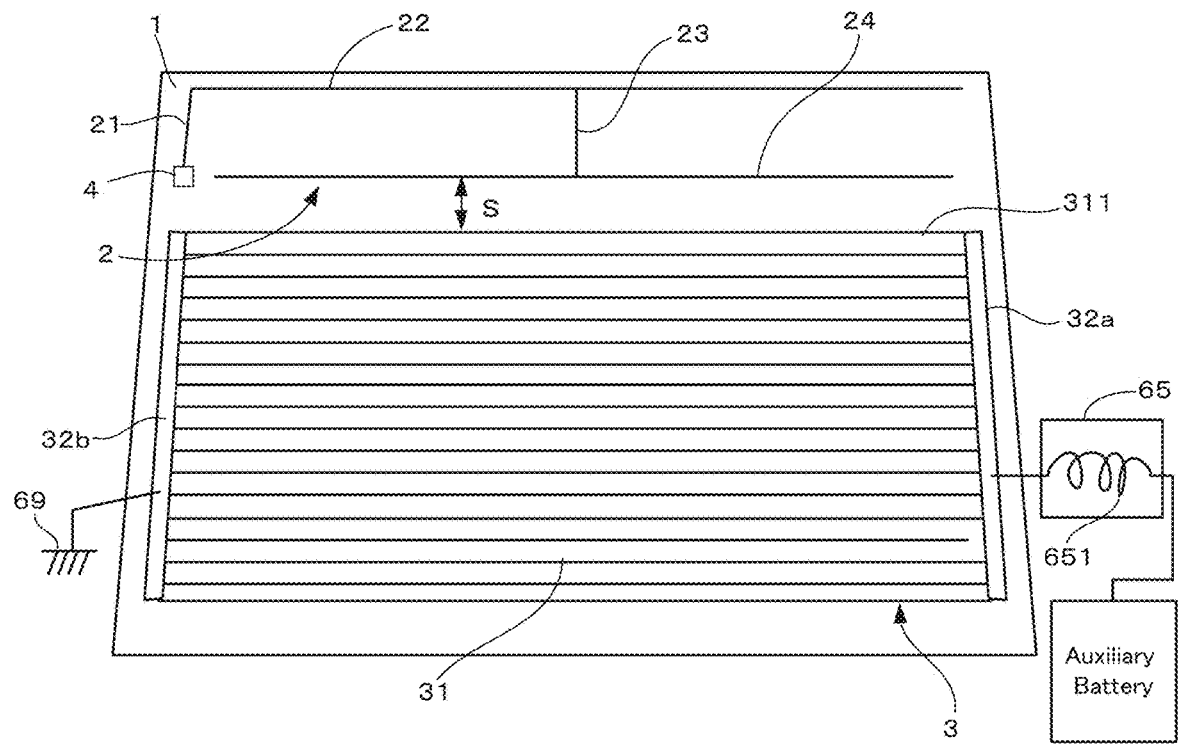
FIG. 7 is a front view of the rear window according to Embodiment 2.

The following describes Embodiment 2 of a glass antenna according to Invention 2, with reference to the drawings. The glass antenna in this embodiment is mounted on the rear window of a hybrid vehicle as in Embodiment 1. FIG. 7 is a front view of the rear window in this embodiment.

1. Overview and Features of Glass Antenna

As illustrated in FIG. 7, the glass antenna in this embodiment has roughly the same structure as the glass antenna in Embodiment 1. The following mainly describes the differences from Embodiment 1.

In the glass antenna in this embodiment, the distance between the FM antenna element 2 and the defogger 3 is not limited, and may be 40 mm or less.

As illustrated in FIG. 7, a noise filter 65 including a coil (RFC: Radio Frequency Choke Coil) 651 is connected between the right bus bar (anode bus bar) 32a in the defogger 3 and an auxiliary battery in this embodiment. Meanwhile, no noise filter is connected between the left bus bar (cathode bus bar) 32b and a vehicle ground 69. The noise filter 65 prevents noise from the auxiliary battery from flowing into the defogger 3. That is to say, the defogger 3 is capacitively coupled to the FM antenna element 2 and also functions as an FM antenna, and noise in the FM antenna element 2 can be reduced by providing such a noise filter. To achieve this noise reduction effect, for example, the inductance of the coil 651 of the noise filter 65 is preferably 0.5 to 5.0 pH, and further preferably 0.7 to 2.0 pH. Moreover, the power supplying terminal 4 of the FM antenna element 2 is on the opposite side to the power supplying bus bar 32a in this embodiment. This also reduces any noise that may be received by the FM antenna element 2.

In this embodiment, no noise filter is provided on the left bus bar 32b side connected to the vehicle ground, for the following reason. The glass antenna in this embodiment is mounted on the above-mentioned hybrid vehicle, and thus the defogger 3 in the glass antenna is susceptible to radiation noise from the DC-DC converter. If a noise filter is also provided on the vehicle ground 69 side, the radiation noise received by the defogger 3 stops at the noise filter on the vehicle ground 69 side, and does not flow toward the vehicle ground 69. This causes the accumulation of radiation noise in the defogger 3, as a result of which, the FM antenna element 2 is affected by noise. Hence, no noise filter is provided on the left bus bar 32b side.

2. Modification

While the embodiment according to Invention 2 has been described above, the present invention is not limited to the above embodiment, and various changes can be made without departing from the scope of the invention. The following modifications may be combined as appropriate.

The shape of the FM antenna element and the shape of the defogger 3 in the above embodiment are examples, and various other shapes may be used as long as at least the FM antenna element 2 and the defogger 3 are capacitively coupled. For example, another element may be added to the FM antenna element 2, and a vertical element may be added to the defogger 3 as appropriate.

3. Example B

Example B is described below. Example B is merely an example, and does not limit Invention 2.

The following example and comparative examples each with a distance S of 60 mm in a glass antenna having the FM antenna element and defogger of the pattern illustrated in FIG. 7 were prepared. In each of the example and comparative examples, a noise filter including an RFC was provided between the right bus bar and an auxiliary battery and/or between the left bus bar and the vehicle ground, or no noise filter was provided between the right bus bar and the auxiliary battery and between the left bus bar and the vehicle ground. These glass antennas were provided on a hybrid vehicle having a DC-DC converter in its rear part as illustrated in FIG. 1. The central frequency of radiation noise generated in the DC-DC converter was 76 MHz.

TABLE 2

| | Example 3 | Comparative Example 5 | Comparative Example 6 | Comparative Example 7 |
|---|---|---|---|---|
| Noise filter on auxiliary battery side | Provided | Not provided | Provided | Not provided |
| Noise filter on vehicle ground side | Not provided | Not provided | Provided | Provided |

Figure 8:
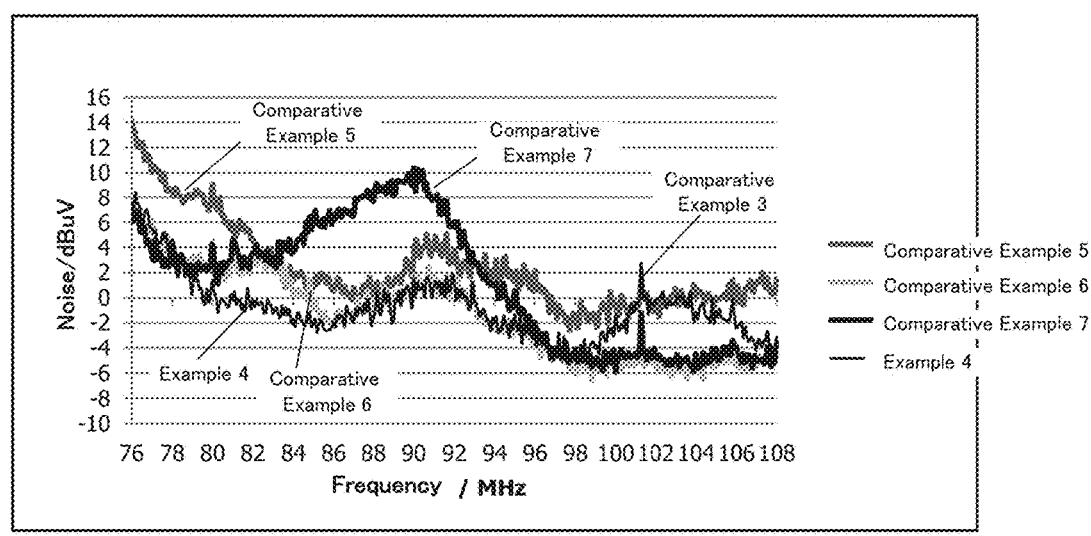
FIG. 8 is a graph illustrating noise in the whole FM frequency band in Example 3 and Comparative Examples 5 to 7.
Figure 9:
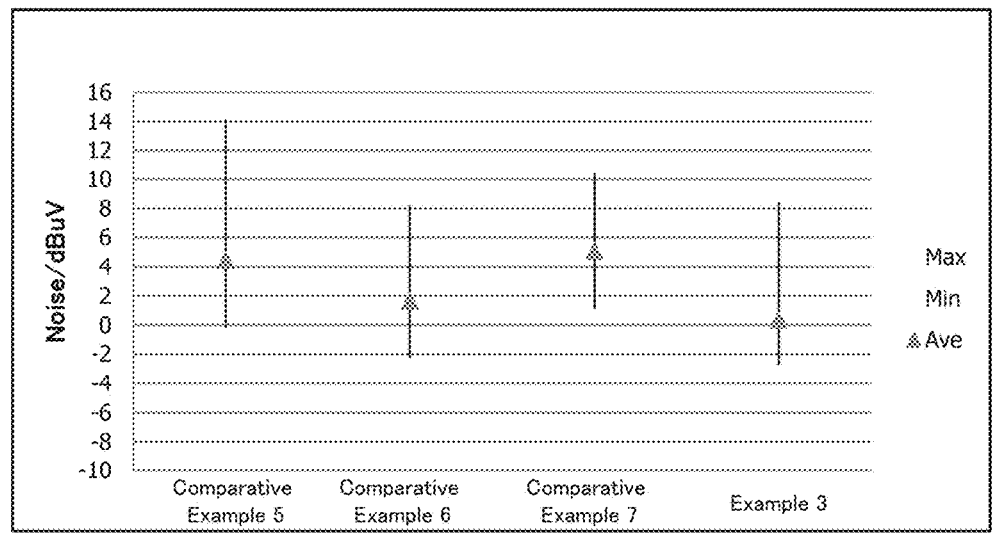
FIG. 9 is a graph illustrating the distribution of noise in the whole FM frequency band in Example 3 and Comparative Examples 5 to 7.

The above-mentioned example and comparative examples were prepared, and noise at all FM radio wave frequencies was measured. FIG. 8 illustrates the results. The noise in the domestic frequency band of 76 to 90 MHz was extracted from FIG. 8, and FIG. 9 illustrates the range and average of noise in each of the examples and comparative examples in this frequency band. As illustrated in FIGS. 8 and 9, Example 3 had less noise in the domestic frequency band than Comparative Examples 5 to 7. For example, the average value of noise was even lower than that of Comparative Example 6 having the noise filter on both bus bar sides.

C. Embodiment 3

Figure 10:
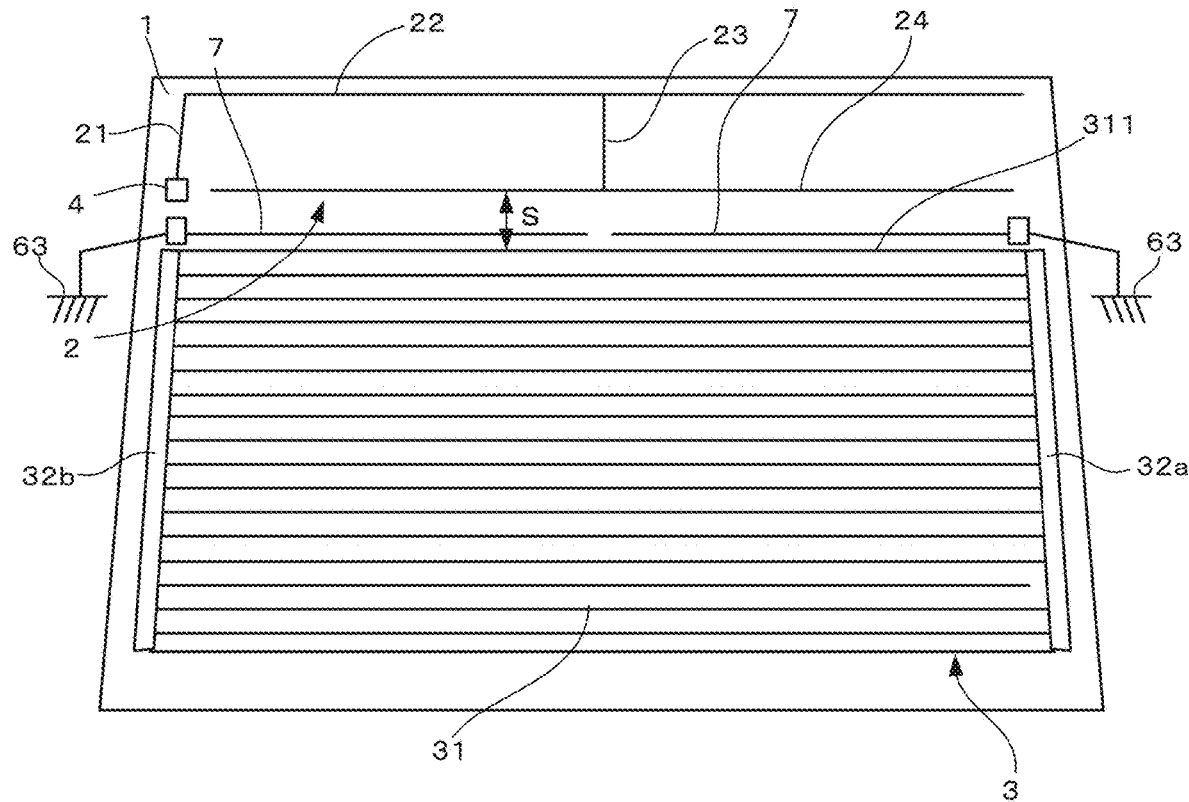
FIG. 10 is a front view of the rear window according to Embodiment 3.

The following describes Embodiment 3 of a glass antenna according to Invention 3, with reference to drawings. The glass antenna in this embodiment is mounted on the rear window of a hybrid vehicle as in Embodiment 1. FIG. 10 is a front view of the rear window in this embodiment.

1. Overview and Features of Glass Antenna

As illustrated in FIG. 10, the glass antenna in this embodiment has roughly the same structure as the glass antenna in Embodiment 1. The following mainly describes the differences from Embodiment 1.

In the glass antenna in this embodiment, the distance between the FM antenna element 2 and the defogger 3 is not limited, and may be 40 mm or less.

As illustrated in FIG. 10, two linear noise rejection elements 7 extending in the horizontal direction are provided between the FM antenna element 2 and the defogger 3 in this embodiment. These noise rejection elements 7 are located at a predetermined spacing along the horizontal direction. The spacing between the noise rejection elements is not limited. For example, the spacing may be freely set in the range of 10 to 200 mm. The length of each noise rejection element 7 is not limited. For example, the length may be about 214±50 mm with respect to the central frequency F, and is preferably ±30 mm. Each noise rejection element 7 is connected to the vehicle ground 63. Each noise rejection element 7 is made of the same material as the FM antenna element 2 or defogger 3.

Such noise rejection elements 7 can reduce noise in the FM antenna element 2.

2. Modifications

While the embodiment according to Invention 3 has been described above, the present invention is not limited to the above embodiment, and various changes can be made without departing from the scope of the invention. The following modifications may be combined as appropriate.

<2-1>

Although each noise rejection element 7 is connected to the vehicle ground 69 in the above embodiment, being connected to the vehicle ground 69 is not essential, and the noise rejection element 7 may not be connected to the vehicle ground 69.

<2-2>

Although the number of noise rejection elements is two in the above embodiment, the number of noise rejection elements may be three or more.

3. Example C

Example C is described below. Example C is merely an example, and does not limit Invention 3.

The following examples and comparative example each with a distance S of 60 mm in a glass antenna with the FM antenna element and defogger of the pattern illustrated in FIG. were prepared. The distance between each noise rejection element and the defogger was set to 10 mm. Specifically, in Example 4, two noise rejection elements were provided and connected to the vehicle ground. The length of each noise rejection element was 530 mm, and the horizontal spacing between the noise rejection elements was 12 mm. In Example 5, two noise rejection elements were provided, but were not connected to the vehicle ground. In Comparative Example 8, no noise rejection element was provided. These glass antennas were provided on a hybrid vehicle having a DC-DC converter in its rear part as illustrated in FIG. 1. The central frequency F of radiation noise generated in the DC-DC converter was 83 MHz. The length of each noise rejection element in Examples 4 and 5 was λ/4 mm, with respect to the wavelength λ of the central frequency F.

TABLE 3

|  | Example 4 | Example 5 | Comparative Example 8 |
|---|---|---|---|
| Noise rejection element | 2 | 2 | None |
| Vehicle ground | Connected | Not connected | Not connected |

Figure 11:
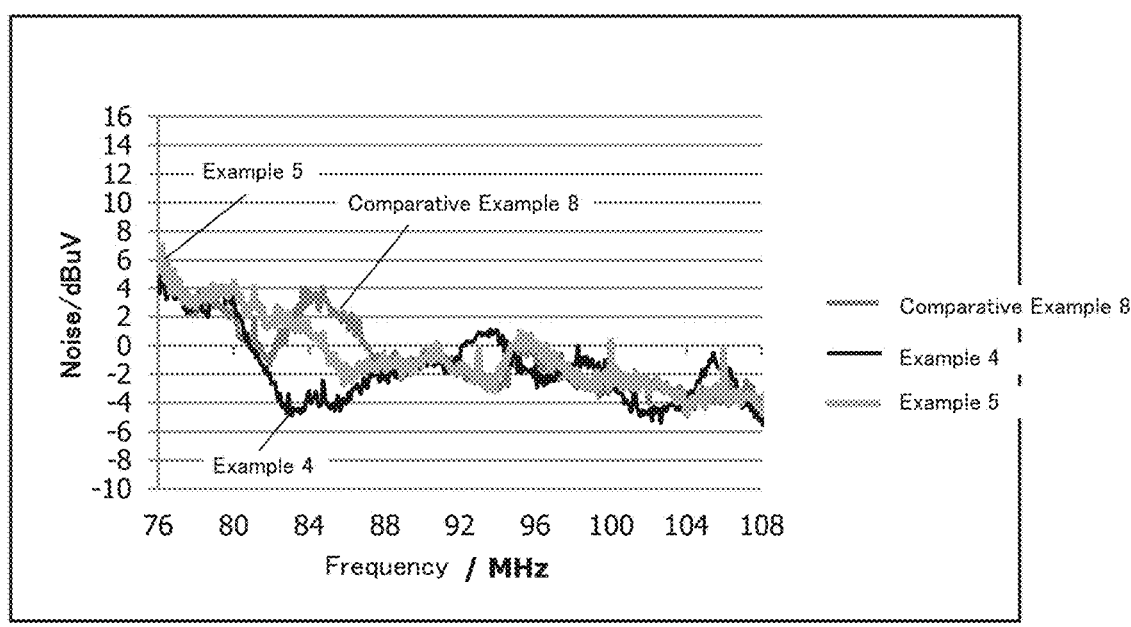
FIG. 11 is a graph illustrating noise in the whole FM frequency band in Examples 4 and 5 and Comparative Example 8.

The above-mentioned examples and comparative example were prepared, and noise at all FM radio wave frequencies was measured. FIG. 11 illustrates the results. As illustrated in FIG. 11, Examples 4 and 5 had less noise than Comparative Example 8, especially in the domestic frequency band.

D. Embodiment 4

Figure 12:
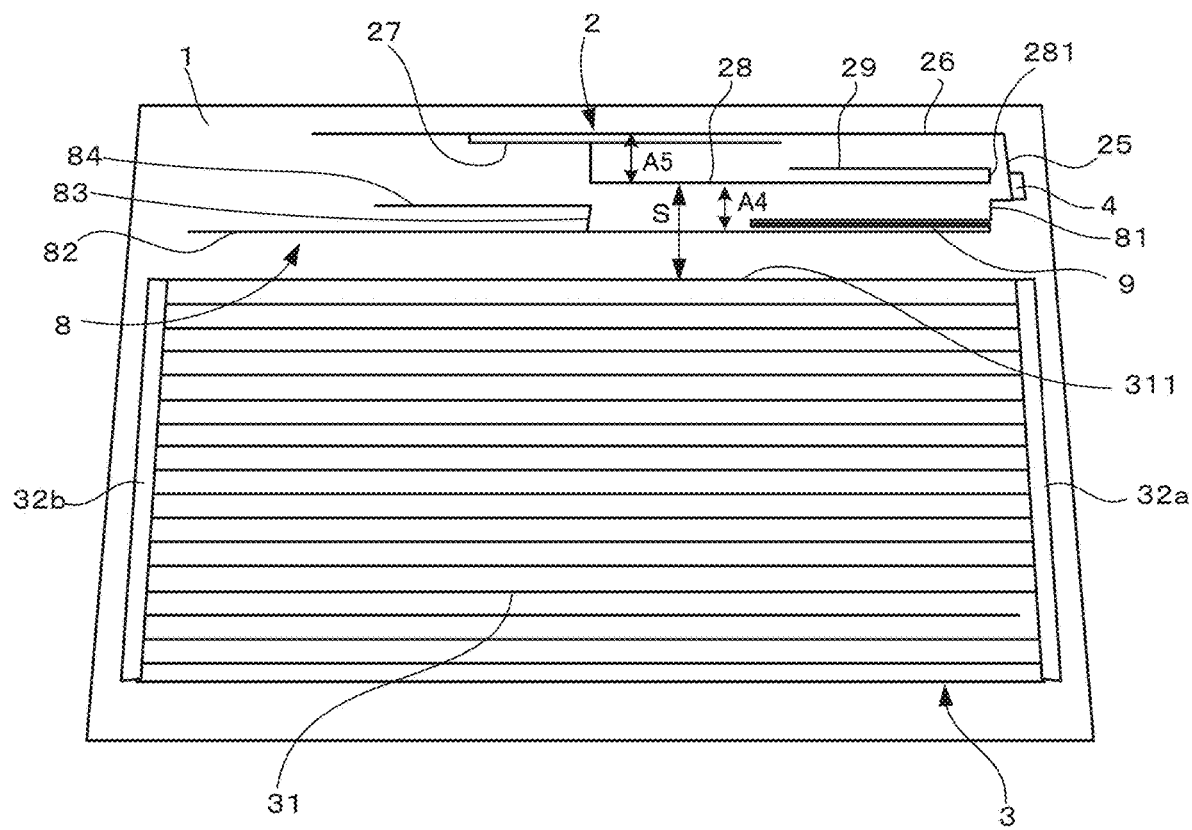
FIG. 12 is a front view of the rear window according to Embodiment 4.

The following describes Embodiment 4 of a glass antenna according to Invention 4, with reference to drawings. The glass antenna in this embodiment is mounted on the rear window of a hybrid vehicle as in Embodiment 1. FIG. 12 is a front view of the rear window in this embodiment.

1. Overview of Glass Antenna

The glass antenna is described below. As illustrated in FIG. 12, the glass antenna in this embodiment is located on the rear window 1 of the hybrid vehicle, and includes an FM antenna element 2 and a defogger 3 (heater).

A power supplying terminal 4 is provided on the upper side with respect to the center of the right edge of the rear window 1. The FM antenna element 2 and an AM antenna element 8 are connected to the power supplying terminal 4. The FM antenna element 2 is located above the AM antenna element 8. The defogger 3 is located below the AM antenna element 8. The AM antenna element 8 is thus situated between the FM antenna element 2 and the defogger 3.

The FM antenna element 1 includes a first vertical element 25 extending upward from the power supplying terminal 4, and a first horizontal element 26 extending in the horizontal direction from the upper end of the first vertical element 25. An L-shaped first L-shaped element 27 is connected to the first horizontal element 26 at a position left of the center. A second L-shaped element 28 is connected to the first L-shaped element 27 at a position near the center of the rear window 1. The second L-shaped element 28 is longer than the first L-shaped element 27 in the vertical direction, and has its left end extending to near the power supplying terminal 4. The left end of the second L-shaped element 28 is connected to a second horizontal element 29 extending leftward, via a short fold-back portion 281 extending upward.

The AM antenna element 8 is described below. The AM antenna element 8 includes a first vertical element 81 extending downward from the power supplying terminal 4. The lower end of the first vertical element 81 is connected to a stub 9 formed by folding back an antenna wire. The stub 9 will be described later. The stub 9 is connected to a first horizontal element 82 extending leftward. A second vertical element 83 extending upward is connected to the first horizontal element 82 at a position near the center. The upper end of the second vertical element 83 is connected to the second horizontal element 84 extending leftward. The dimensions of the antenna elements are not limited. For example, the distance A4 between the first horizontal element of the AM antenna element and the second L-shaped element 28 of the FM antenna element may be 60 mm, and the distance A5 between the second L-shaped element 28 and first horizontal element 26 of the FM antenna element may be 60 mm.

The stub is described below. The stub is formed by bending an antenna wire as mentioned above, and constitutes a parallel resonance circuit. The parallel resonance circuit has the function of allowing passage of a received signal in the AM broadcast frequency band and blocking or attenuating a received signal in the FM broadcast frequency band. Thus, the noise in the FM broadcast frequency band received by the elements in the AM antenna element 8 on the side of the stub 9 opposite to the power supplying terminal 4, i.e. the first horizontal element 82, the second vertical element 83, and the second horizontal element 84, is prevented from flowing toward the FM antenna element, that is, flowing into the power supplying terminal 4.

Figure 13:
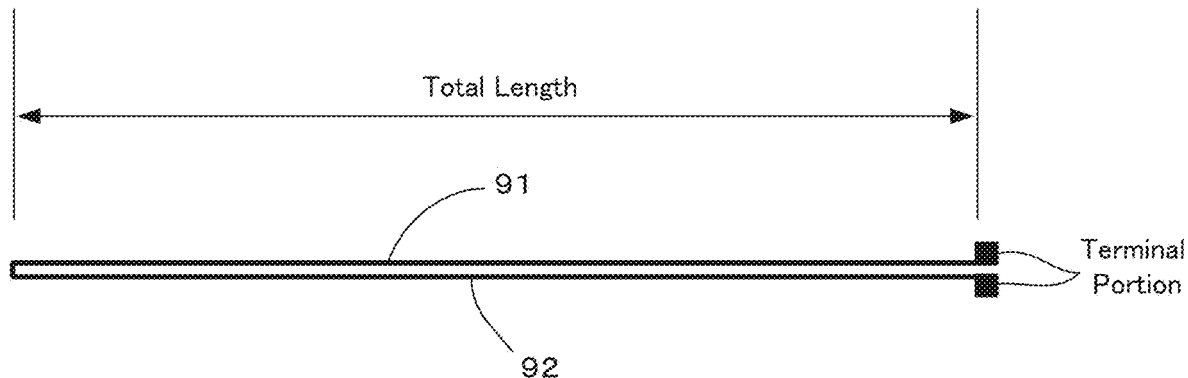
FIG. 13 is a plan view illustrating an example of a stub pattern.
Figure 13:
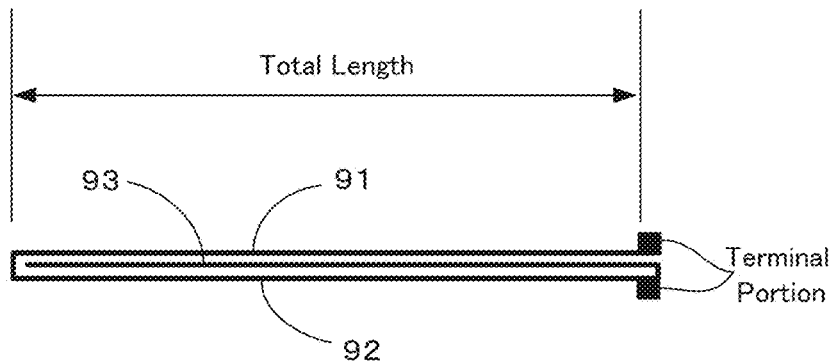
Figure 13:
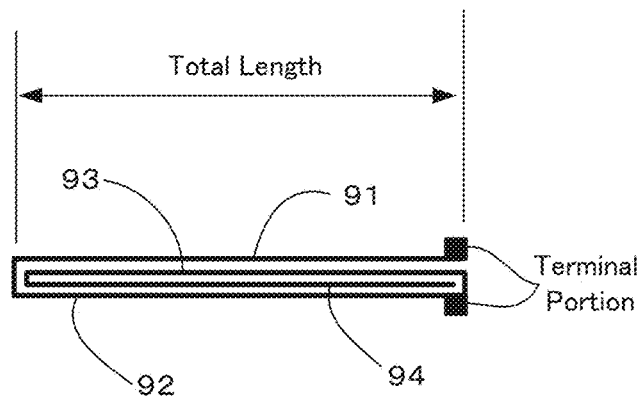

The stub 9 constituting such a parallel resonance circuit may have any of a variety of patterns. This is specifically shown in FIG. 13. In FIG. 13(*a*), a first antenna wire 91 and a second antenna wire 92 extending parallel to each other are connected at one end (hereafter, "stub pattern 1"). The stub pattern 1 has one antenna wire fold-back portion. In FIG. 13(*b*), the stub has the pattern illustrated in FIG. 12, where a third antenna wire 93 extends from the base end of the second antenna wire 92 in the stub pattern 1 to the connection portion between the first antenna wire 91 and the second antenna wire 92 (hereafter, "stub pattern 2"). The stub pattern 2 has two antenna wire fold-back portions. In FIG. 13(*c*), a fourth antenna wire 94 extends from the end of the third antenna wire 93 in the stub pattern 2 to the base end of the second antenna wire 92 between the second antenna wire 92 and the third antenna wire (hereafter, "stub pattern 3"). The stub pattern 3 has three antenna wire fold-back portions. As understood from the comparison of the stub patterns 1, 2, and 3, the horizontal length can be reduced when the number of fold-back portions is larger. This contributes to a more compact stub.

The defogger 3 is described below. The defogger 3 is approximately the same as that in Embodiment 1, but differs in the bus bars. Specifically, in this embodiment, the left bus bar 32*b* is supplied with power from an auxiliary battery, and the right bus bar 32*a* is connected to the vehicle ground. A horizontal element 311 at the top of the defogger 3 and the second L-shaped element 28 at the bottom of the FM antenna element 2 are approximately parallel to each other, and thus the elements 311 and 28 are capacitively coupled. Hence, the defogger 5 not only has a defogging function, but also functions as an antenna together with the FM antenna element 2.

The distance S between the horizontal element 311 of the defogger 3 and the second L-shaped element 28 of the FM antenna element 2 is not limited. For example, the distance S is preferably more than 40 mm, further preferably 50 mm or more, and particularly preferably 60 mm or more.

Each antenna element described above is made of a known conductive material, and mounted on the glass surface using screen printing or the like.

2. Features

The glass antenna having the structure described above has the following effects. In this embodiment, the AM antenna element 8 is connected to the antenna pattern constituting the parallel resonance circuit, i.e. the stub 9. Thus, the noise in the FM broadcast frequency band from among the noise received by the AM antenna element 8 is prevented from flowing toward the FM antenna element 2, that is, flowing into the power supplying terminal 4. In particular, the hybrid vehicle as in this embodiment is provided with the DC-DC converter. Driving the DC-DC converter generates radiation noise. The AM antenna element 8 is therefore susceptible to noise. However, noise in the FM antenna element 2 can be blocked or reduced by providing a stub 9 such as that described above.

Particularly in the glass antenna in this embodiment, while noise in the FM antenna element 2 can be reduced by setting the distance S between the FM antenna element 2 and the defogger 3 to more than the predetermined distance as in Embodiment 1, placing the AM antenna element 8 between the FM antenna element 2 and the defogger 3 leads to a new problem in that noise received by the AM antenna element 8 affects the FM antenna element 2. Hence, in this embodiment, the above-described stub 9 is provided so that noise received by the FM antenna element 2 is blocked or reduced even if the AM antenna element 8 is provided.

The examples of the stub 9 illustrated in FIG. 13 indicate that the larger the number of fold-back portions, the shorter the stub 9 can be made. This has the following effect. In the example in FIG. 12, the stub 9 can be made shorter as the number of fold-back portions is increased, which contributes to a longer distance between the power supplying bus bar 32*b* and the stub 9. This reduces the noise received by the stub 9 itself from the power supplying bus bar 32*b* side.

3. Modifications

While the embodiment according to Invention 4 has been described above, Invention 4 is not limited to the above embodiment, and various changes can be made without departing from the scope of the invention. The following modifications may be combined as appropriate.

<3-1>

The shape of the FM antenna element 1, the shape of the AM antenna element 8, and the shape of the defogger 3 in the above embodiment are examples, and various other shapes may be used as long as at least the AM antenna element 8 is located between the FM antenna element and the defogger and the FM antenna element 2 and the defogger 3 are capacitively coupled.

<3-2>

Although the FM antenna element 1 and the AM antenna element 8 are connected to one power supplying terminal 4 in the above embodiment, for example, two feed elements may be provided, and the antenna elements 1 and 8 may be connected to the respective feed elements. In such a case, for example, it is possible that noise received by the AM antenna element 8 will enter an FM amplifier via a nearby lead wire for the FM antenna element while being transmitted from the power supplying terminal to an AM amplifier. Accordingly, even in the case where the glass antenna has a power supplying terminal for each of the antenna elements 1 and 8, it is effective to provide the stub 9 for the AM antenna element 8.

<3-3>

The shape of the stub is not limited, and may take a shape other than the above-mentioned shapes. The stub may have four or more fold-back portions.

<3-4>

The matters described in foregoing Embodiments 1 to 4 may be combined as appropriate.

4. Example D

Example D is described below. Example D is merely an example, and does not limit Invention 4.

Below, stub shapes were investigated. Radio wave transmission loss was measured using Example 6 (stub pattern 1) corresponding to FIG. 13(a), Example 7 (stub pattern 2) corresponding to FIG. 13(b), and Example 8 (stub pattern 3) corresponding to FIG. 13(c). The dimensions of the stub in each example were as follows. The stub was designed with respect to 83 Hz.

TABLE 4

|  | Example 6 | Example 7 | Example 8 |
|---|---|---|---|
| Number of lines with fold-back portion in between | 2 | 3 | 4 |
| Number of fold-back portions | 1 | 2 | 3 |
| Total length (mm) | 490 | 320 | 225 |
| Total length/wavelength | 0.26 | 0.17 | 0.12 |

Figure 14:
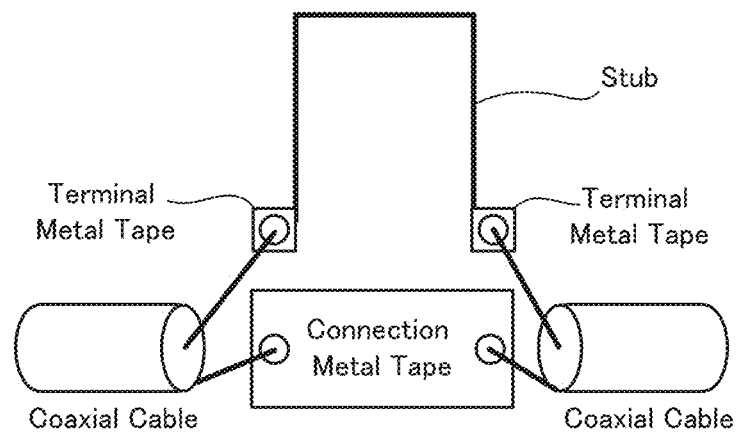
FIG. 14 is a diagram illustrating a radio wave transmission loss measurement method.
Figure 15:
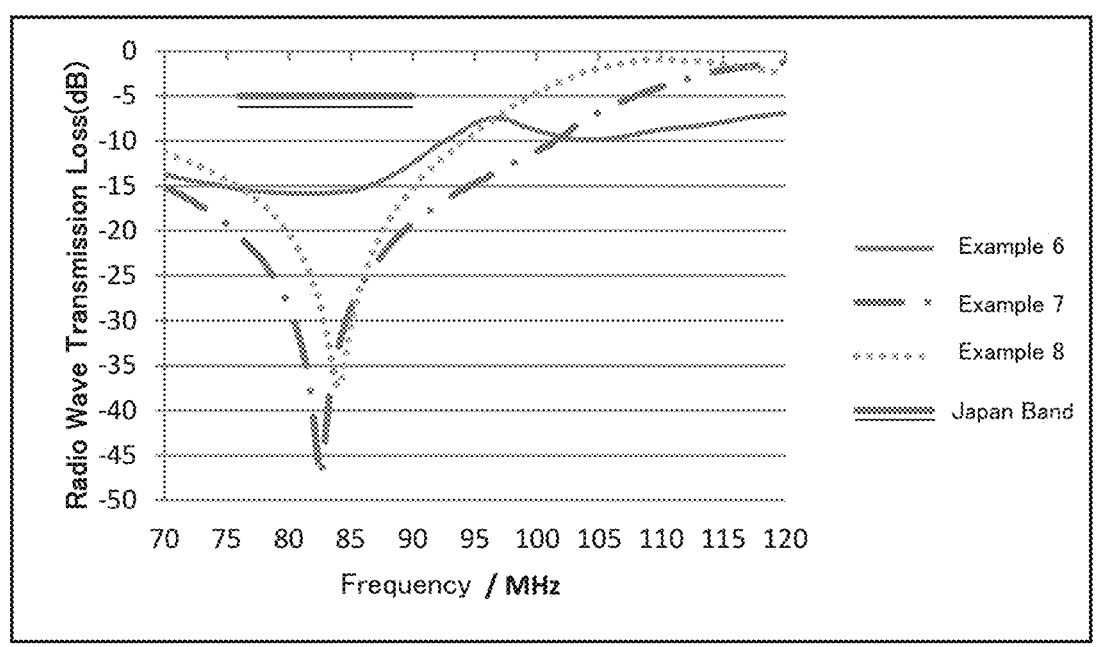
FIG. 15 is a graph illustrating noise in the whole FM frequency band in Examples 6 to 8.

FIG. 14 illustrates the measurement method for radio wave transmission loss. A 5 mm square piece of terminal metal tape was placed on the terminal portions at both ends of each stub, and connected to a coaxial cable. A piece of connection metal tape that was 20 mm in width and 10 mm in length was placed between the coaxial cables, and electrically connected to the coaxial cables. The stub and the metal tape were located on a glass plate. Radio wave transmission loss in the FM broadcast frequency band was measured in this state. FIG. 15 illustrates the results.

As illustrated in FIG. 15, Example 6 had a radio wave cutting effect throughout the whole band including the overseas frequency band, whereas Examples 7 and 8 in particular were highly effective at cutting out radio waves in the domestic frequency band of 76 to 90 MHz.

E. Embodiment 5

Figure 16:
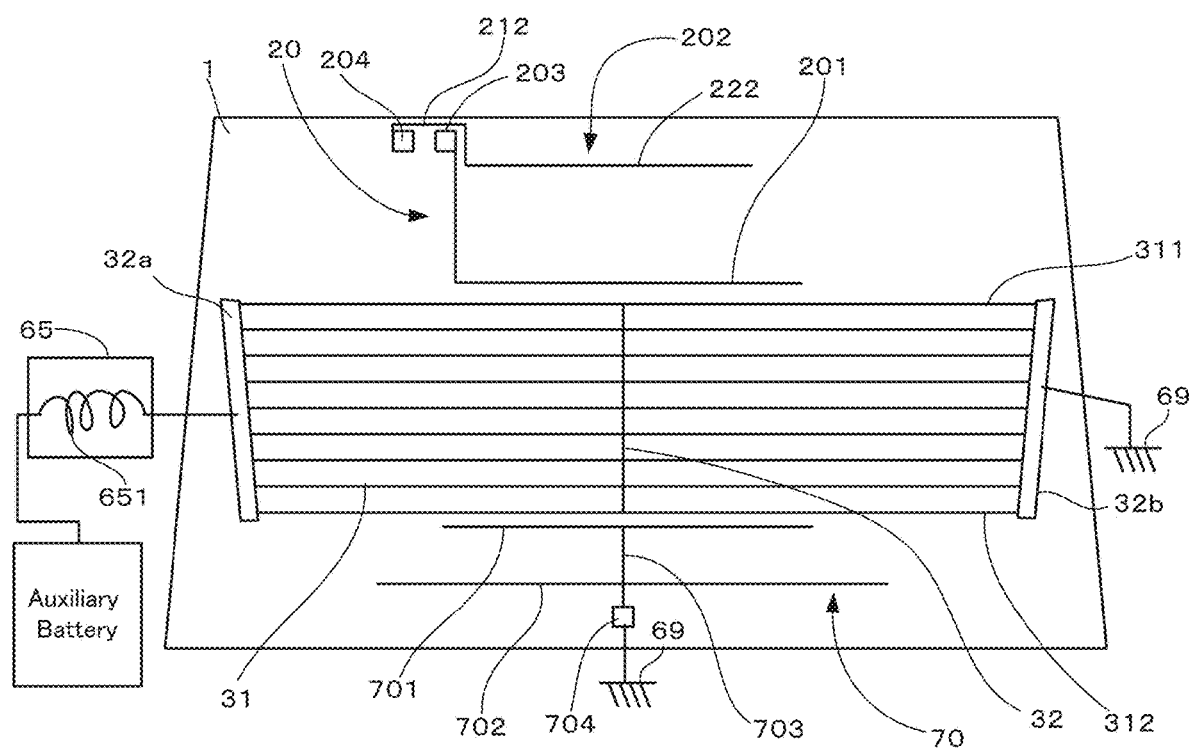
FIG. 16 is a front view of the rear window according to Embodiment 5.

The following describes Embodiment 5 of a glass antenna according to Invention 5, with reference to the drawings. The glass antenna in this embodiment is mounted on the rear window of a hybrid vehicle as in Embodiment 1. FIG. 16 is a front view of the rear window in this embodiment.

1. Overview of Glass Antenna

As illustrated in FIG. 16, the glass antenna in this embodiment is mounted on the rear window 1 of the hybrid vehicle, and includes an FM antenna element 20, the defogger 3 (heater), and a noise suppression element 70 arranged in this order from the top.

The FM antenna element 20 in this embodiment is a dipole antenna, and is composed of an antenna body element 201 and a ground connection element 202. The antenna body element 201 is L-shaped, and extends downward from a power supplying terminal 203 located near the center of the upper edge of the rear window 1. The ground connection element 202 extends rightward from a ground connection terminal 204 located on the left side of the power supplying terminal 203. Specifically, the ground connection element 202 includes a first portion 212 extending horizontally rightward over the power supplying terminal 203, and a second portion 222 extending, on the right side of the power supplying terminal 203, rightward in an L like shape from the right end of the first portion 212. The ground connection terminal 204 is connected to a vehicle ground (not illustrated). The antenna body element 201 extends further right than the second portion 222 of the ground connection element 202 does.

The following describes the defogger 3. The defogger 3 is placed below the antenna body element 24 of the FM antenna element 2, and includes a pair of power supplying bus bars 32a and 32b extending in the vertical direction along both side edges of the rear window 1. The left bus bar (anode bus bar) 32a is supplied with power from an auxiliary battery, and the right bus bar (cathode bus bar) 32b is connected to the vehicle ground 69. The same noise filter 65 as in Embodiment 2 is located between the auxiliary battery and the bus bar 32a.

A plurality of horizontal elements 31 are arranged in parallel at a predetermined spacing between the bus bars 32a and 32b. Moreover, a vertical element 32 is located between the bus bars 32a and 32b, and intersects with the plurality of horizontal elements 31. Specifically, the vertical element 32 extends from the top horizontal element 311 to the bottom horizontal element 312. The horizontal elements 31 formed in this way generate heat for defogging with power supplied from the bus bars 32a and 32b. Meanwhile, the vertical element 32 is not supplied with power and does not contribute to heating, but functions as an FM antenna reception unit.

The horizontal element 311 at the top of the defogger 3 and the antenna body element 201 of the FM antenna element 2 are approximately parallel to each other, and thus the elements 311 and 201 are capacitively coupled. Hence, the defogger 5 not only has a defogging function, but also functions as an FM antenna reception unit together with the FM antenna element 2.

The noise suppression element 70 is located below the defogger 3. The noise suppression element 70 includes a first portion 701 extending in parallel with the horizontal element 311 at the bottom of the defogger 3, a second portion 702 located below the first portion 701 and extending in parallel with the first portion 701, and a third portion 703 extending downward from the center of the first portion 701 and intersecting with the second portion 702. The first portion 701 is near the horizontal element 312 at the bottom of the defogger 3, so that the noise suppression element 70 is capacitively coupled to the defogger 3. The second portion 702 is longer than the first portion 701 in the horizontal direction. The third portion 703 is located at a position corresponding to the vertical element 32 of the defogger, and its lower end connected to a ground connection terminal 704. The ground connection terminal 704 is connected to the vehicle ground 69. The noise suppression element 70 connected to the vehicle ground 69 in this way can function as an antenna, and form an array antenna together with the FM antenna element 20 as described below. The noise suppression element 70 is made of the same material as the FM antenna element 2 or defogger 3.

2. Features

By providing the noise suppression element 70, an array antenna can be formed by the FM antenna element 20 and the noise suppression element 70, as mentioned above. This suppresses noise in the FM antenna element 2, and improves antenna sensitivity. This is described below, with reference to FIG. 17.

Figure 17:
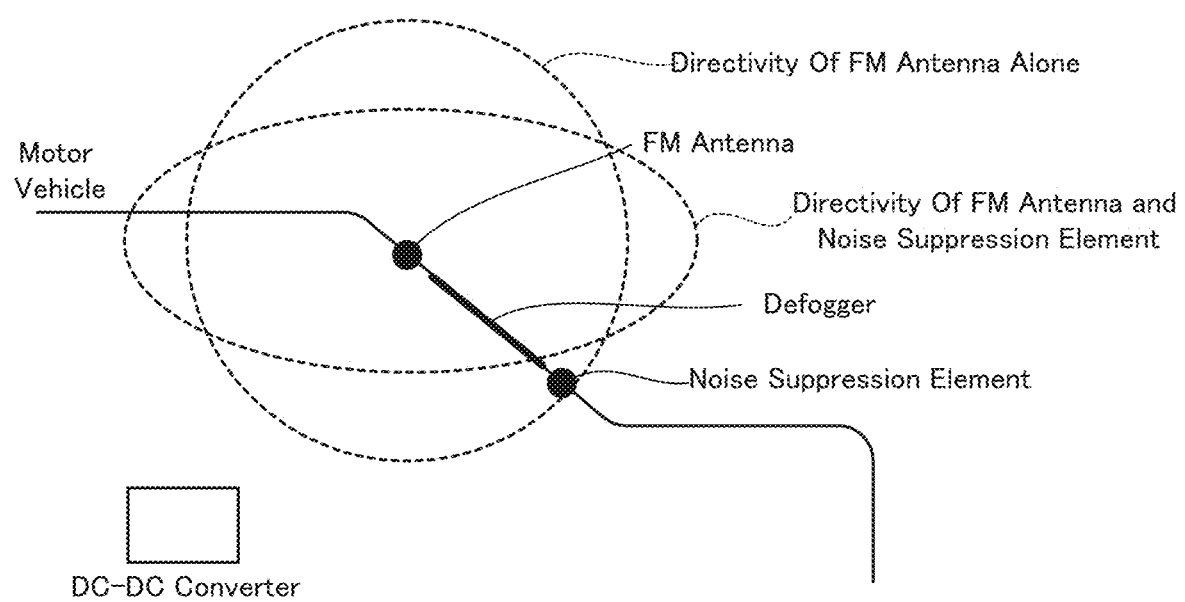
FIG. 17 is a diagram illustrating the effect of a noise suppression element.

FIG. 17 is a sectional view illustrating the vicinity of the rear window of the motor vehicle. As illustrated in FIG. 17, in the case where only the FM antenna element 20 is provided, its directivity is approximately circular in side view. In the case where the noise suppression element 70 is provided below and away from the FM antenna element 20, the directivity of the FM antenna element 20 instead has the shape of an ellipse extending in the front-rear direction of the vehicle as if squashed from above and below. Thus, by providing the noise suppression element 20, the range of directivity of the FM antenna element 20 moves away from the DC-DC converter, as a result of which, the influence of radiation noise (e.g. vehicle interior electric field intensity in the below-mentioned examples) from the DC-DC converter can be suppressed. To achieve this effect, the distance (described later) between the FM antenna element 20 and the noise suppression element 70 is preferably ¼λ or more. Not only the distance between the FM antenna element 20 and the noise suppression element 70 but also the phase difference between the FM antenna element 20 and the noise suppression element 70 can influence the effect, and thus is preferably adjusted as appropriate. FIG. 17 schematically illustrates an example of the directivity of the FM antenna element, and does not illustrate the actual range of directivity.

The directivity of the FM antenna element 20 can thus be controlled by providing the noise suppression element 70 away from the FM antenna element 20, for example, at least half a wavelength (½λ) away from the FM antenna element 20. The defogger 3 can be provided between the FM antenna element 20 and the noise suppression element 70 located away from each other. The limited area of the rear window 1 can be effectively used in this way.

Moreover, by capacitively coupling the noise suppression element 70 and the defogger 3, the defogger 3 can function as part of the antenna. For example, if the noise suppression element alone has an antenna function, the FM band element length (e.g. about 1 m) is required, but by causing the defogger 3 to function as an antenna through capacitive coupling, the noise suppression element 70 can be made more compact. Here, a certain distance (e.g. about half wavelength) between the FM antenna element 20 and the noise suppression element 70 is needed to cause the FM antenna element 20 and the noise suppression element 70 to function as an array antenna. This distance is the distance between the centers of the antenna entities, that is, the distance between the feed point (power supplying terminal 203) of the FM antenna element 20 and the feed point (ground connection terminal 704) of the noise suppression element 70 in this embodiment. Therefore, the performance of the array antenna is unaffected even when the defogger 3 is provided between them and capacitively coupled to the noise suppression element 70.

The noise suppression element 70 is connected to the vehicle ground 69, as mentioned above. This eases the control of the directivity of the FM antenna element 20. Moreover, since a ground is established through the vehicle, grounding is easier. A resistor may be provided instead of a ground.

The vertically extending third portion 703 of the noise suppression element 70 is located to correspond to the vertical element 32 of the defogger. This facilitates the antenna function of the noise suppression element.

By changing the length of the first portion 701 of the noise suppression element 70 or the distance between the horizontal element 311 of the defogger 3 and the first portion 701, the strength of capacitive coupling between the noise suppression element 70 and the defogger 3 can be changed to adjust the performance of the noise suppression element 70 as an antenna. In other words, the adjustment of such a length or distance enables the adjustment of the directivity of the FM antenna element 20 as an array antenna. This will be described later in Example F.

3. Modifications

While the embodiment according to Invention 5 has been described above, Invention is not limited to the above embodiment, and various changes can be made without departing from the scope of the invention. The following modifications may be combined as appropriate.

<3-1>

Although the noise suppression element 70 is connected to the vehicle ground 69 in the above embodiment, the noise suppression element 70 need not necessarily be connected to the vehicle ground 69. Moreover, the noise filter 65 may also be provided between the right bus bar 32b and the vehicle ground 69. The noise filter 65 is, however, not an essential component and may be omitted.

<3-2>

Figure 18:
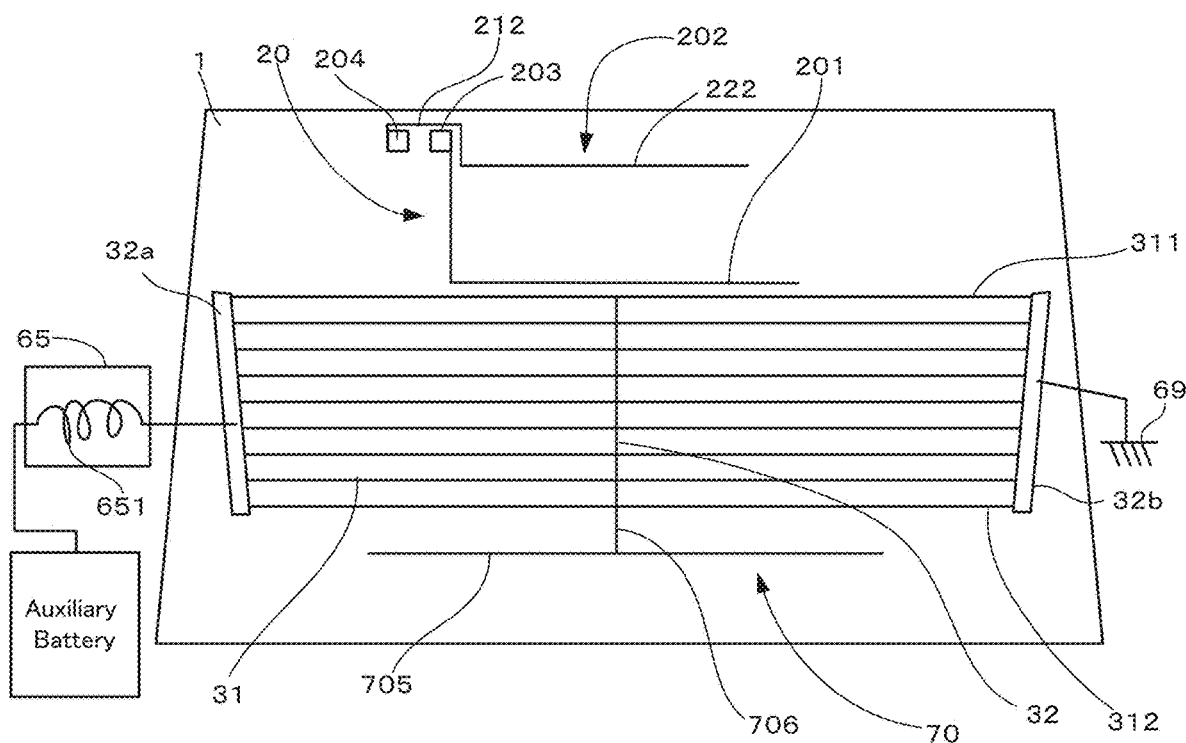
FIG. 18 is a front view of another example of the rear window according to Embodiment 5.

The shape of the noise suppression element 70 is not limited as long as the noise suppression element 70 is on the side of the defogger 3 opposite to the FM antenna element 20. FIG. 18 illustrates an example of the shape. In the example in FIG. 18, the noise suppression element 70 includes a first portion 706 connected to the lower end of the vertical element 32 of the defogger 3 and extending downward and a second portion 705 extending horizontally from the lower end of the first portion 706, and is T-shaped as a whole. This noise suppression element 70 is directly connected to the defogger 3. Thus, the noise suppression element 70 may be capacitively coupled or directly coupled to the defogger 3.

<3-3>

Figure 19:
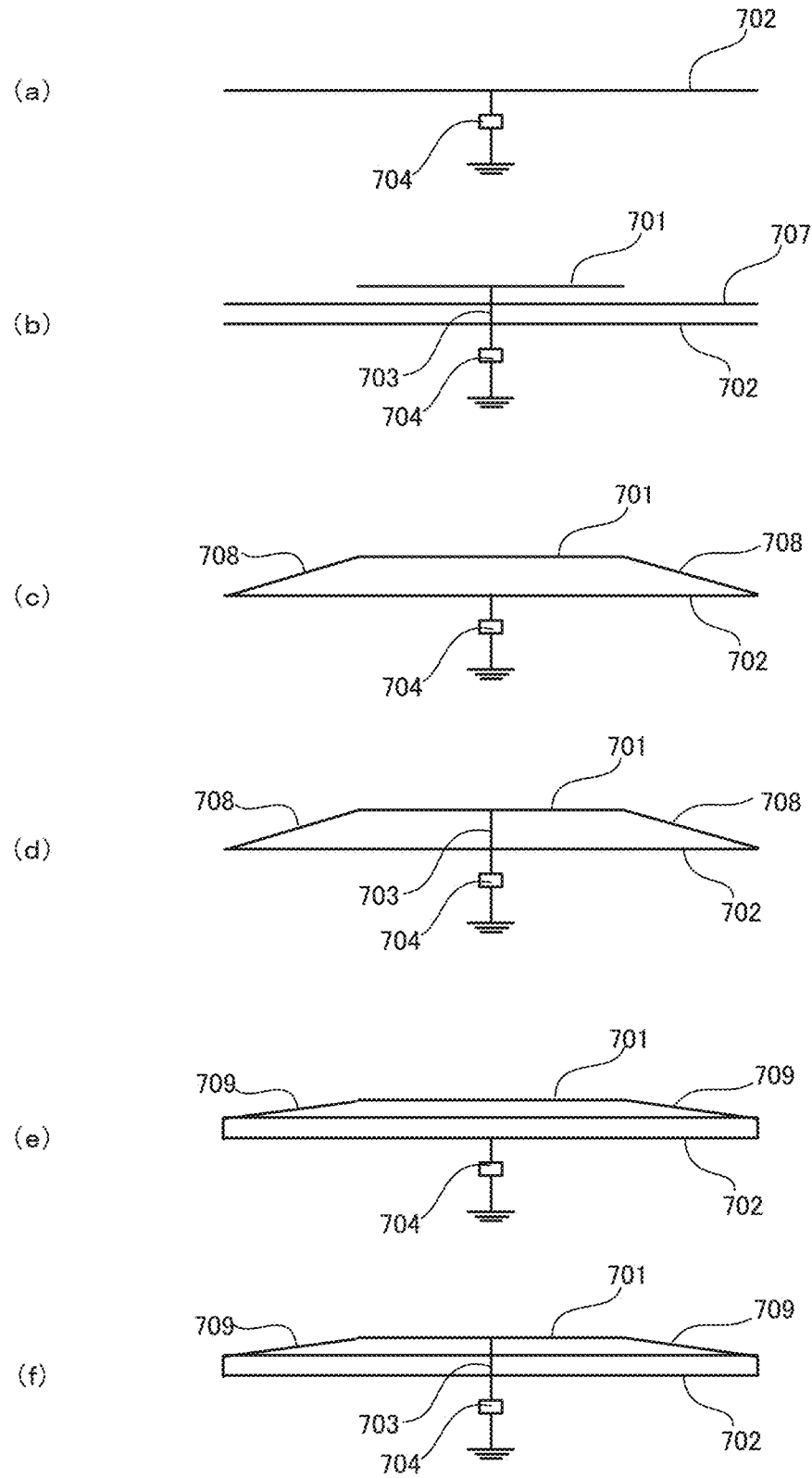
FIG. 19 is a diagram illustrating another example of the noise suppression element.

The noise suppression element 70 may be configured as illustrated in FIG. 19. In the example in FIG. 19(a), the noise suppression element 70 is composed of only the second portion 702. In the example in FIG. 19(b), a fourth portion 704 having approximately the same length as and extending in parallel with the first portion 701 is provided between the first portion 701 and the second portion 702, to form the noise suppression element 70. In the example in FIG. 19(c), a fifth portion 708 connecting the first portion 701 and the second portion 702 at both ends is provided to form the noise suppression element 70 in a trapezoidal shape. In the example in FIG. 19(d), the vertically extending third portion 703 is added in the example in FIG. 19(c). In the example in FIG. 19(e), the above-described first portion 701, second portion 702, and third portion 703 are provided, and sixth portions 709, each of which connecting the end portions of these portions respectively, are further provided to form the noise suppression element 70. In the example in FIG. 19(f), the vertically extending third portion 703 is added to that of the example in FIG. 19(e).

Each of these noise suppression elements 70 has its top portion located directly below the defogger 3 and capacitively coupled to the defogger 3.

<3-4>

The FM antenna element 20 may be unipolar and not dipolar as mentioned above. The shape of the FM antenna element 20 is not limited. The FM antenna element 20 may be capacitively coupled to the defogger 3 as in the above embodiment, or directly coupled to the defogger 3.

<3-5>

The shape of the defogger 3 is not limited as long as it has at least one vertical element 32.

<3-6>

Although the FM antenna element 20 is located above the defogger 3 in the above embodiment, the FM antenna element 20 may be located below the defogger 3, with the noise suppression element 70 being located above the defogger 3.

4. Example E

Example E is described below. Example E is merely an example, and does not limit Invention 5.

Figure 20:
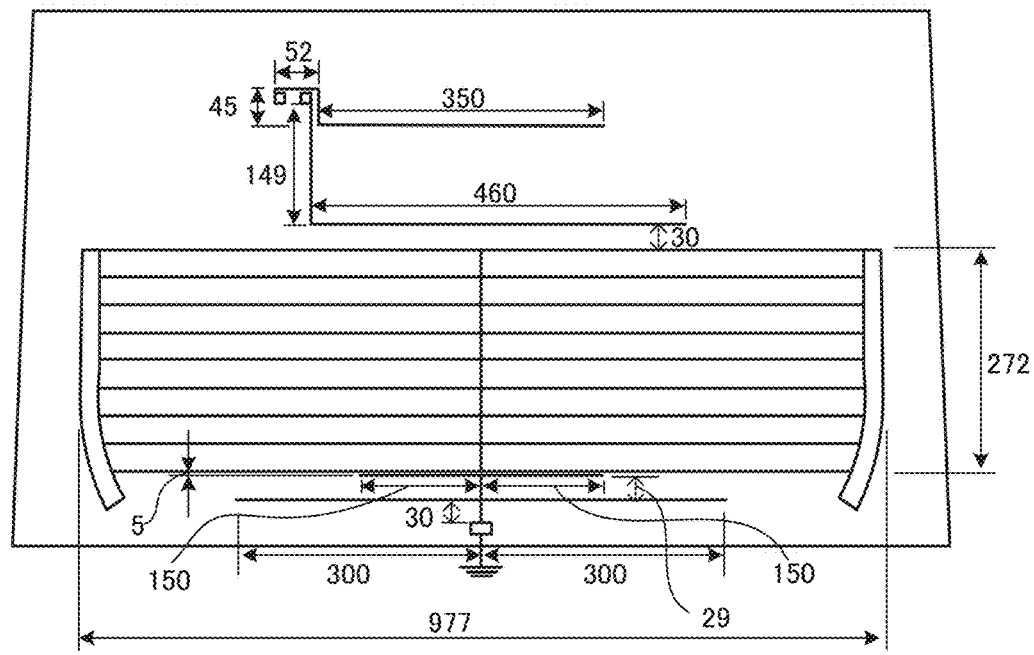
FIG. 20 is a front view of the rear window according to Examples 9 to 11.
Figure 21:
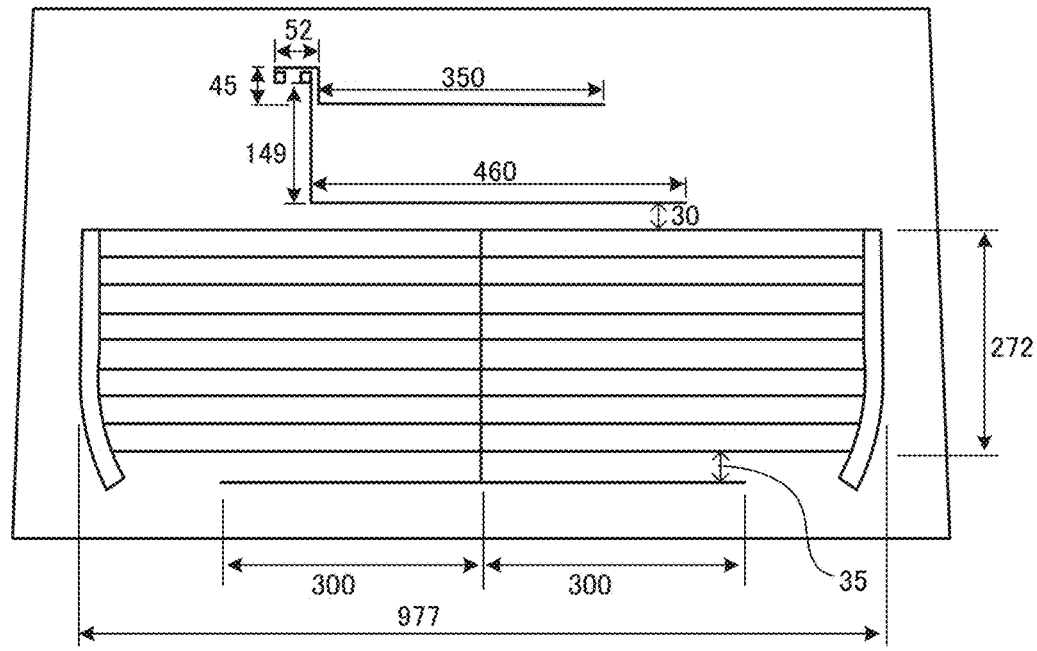
FIG. 21 is a front view of the rear window according to Example 12.
Figure 22:
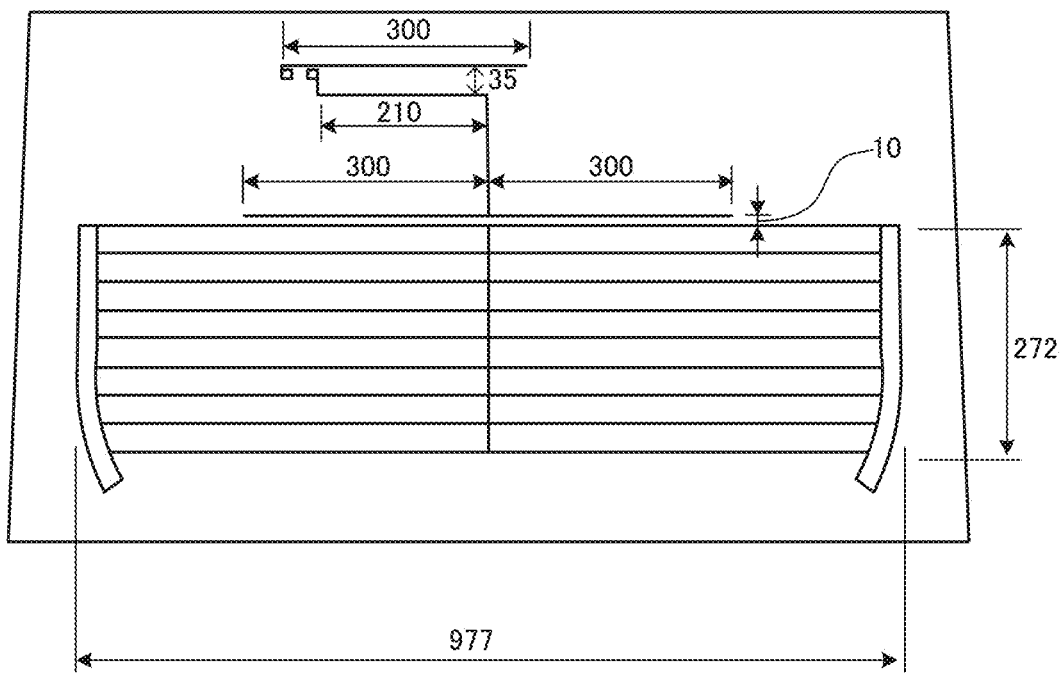
FIG. 22 is a front view of the rear window according to Comparative Example 9.

The following examples and comparative example were prepared. Example 9 has the same structure as in FIG. 16. Example 10 has the same structure as Example 9 except no noise filter is provided in the defogger. Example 11 has the same structure as Example 9 except no ground connection terminal is provided in the noise suppression element. Example 12 has the same structure as in FIG. 18. In Example 12, a noise filter is provided in the defogger. Comparative Example 9 has the same structure of Example 9 but does not have the noise suppression element. FIG. 20 is a diagram illustrating the dimensions of Examples 9 to 11. FIG. 21 is a diagram illustrating the dimensions of Example 12. FIG. 22 is a diagram illustrating Comparative Example 9. These drawings are drawn in units of mm.

The glass antenna in each of Examples 9 to 12 and Comparative Example 9 was provided on a hybrid vehicle having a DC-DC converter in its rear part as illustrated in FIG. 1. The central frequency of radiation noise generated in the DC-DC converter was 100 MHz.

Noise and sensitivity were measured for Examples 9 to 12 and Comparative Example 9, by the same method as in Example A.

Figure 23:
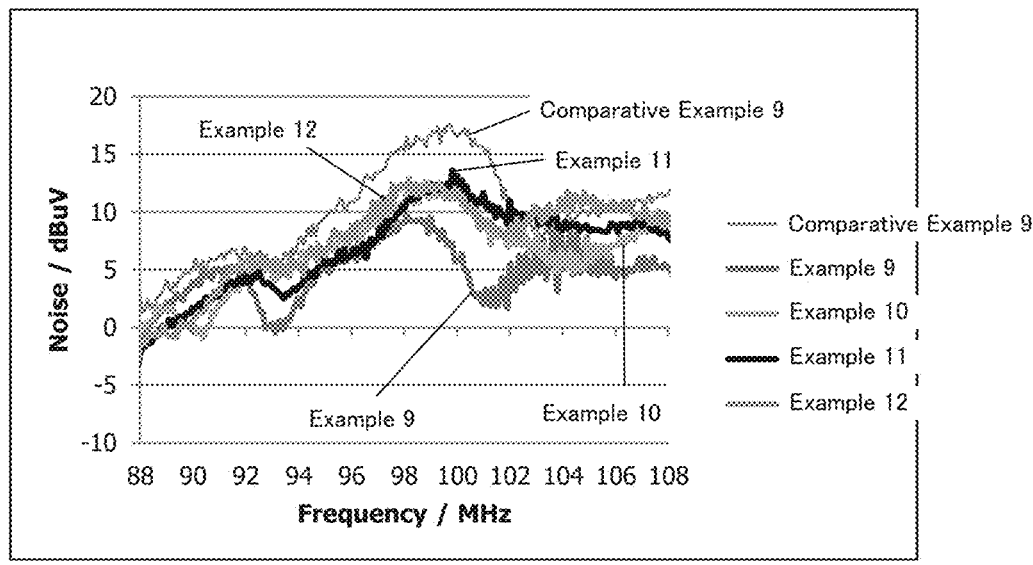
FIG. 23 is a graph illustrating noise in the whole FM frequency band in Examples 9 to 11 and Comparative Example 8.

FIG. 23 illustrates the results regarding noise. As illustrated in FIG. 23, Examples 9 to 12 had less noise than Comparative Example 9 in approximately the whole frequency band. As understood from the comparison between Examples 9 to 11, the noise suppression effect was lower without the noise filter or without the connection to the vehicle ground. This indicates that the noise filter and the vehicle ground are necessary for noise suppression. Example 12, despite including the noise filter, had the same noise suppression effect as Examples 10 and 11. This indicates that capacitively coupling the noise suppression element to the defogger produces a substantially better result.

Figure 24:
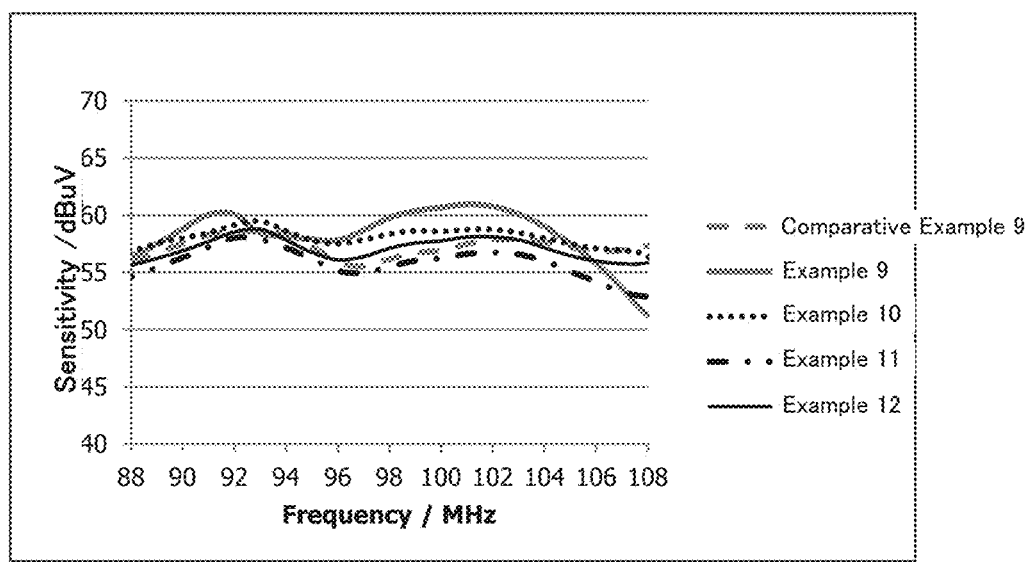
FIG. 24 is a graph illustrating reception sensitivity in the whole FM frequency band in Examples 9 to 11 and Comparative Example 8.

The FM radio wave reception sensitivity was then examined. FIG. 24 illustrates the reception sensitivity in the whole frequency band. Examples 9, 10, and 12 mostly had higher reception sensitivity than Comparative Example 9. Meanwhile, Example 11 had lower reception sensitivity than Comparative Example 9. Thus, Example 11 showed an improved noise suppression effect but lower reception sensitivity than the comparative example. This indicates that, in the case where the noise suppression element is capacitively coupled to the defogger as in Example 11, connection to the vehicle ground is preferable. This also indicates that, while the connection to the vehicle ground is preferable, capacitively coupling the noise suppression element to the defogger produces a substantially better result.

5. Example F

Example F is described below. Example F is merely an example, and does not limit Invention 5.

The following example and comparative example were prepared. Specifically, the window illustrated in FIG. 25 (corresponding to FIG. 16) was prepared as an example. In this example, the antenna sensitivity was measured while changing the dimensions of the FM antenna element, defogger, and noise suppression element. In addition, an electric field corresponding to the DC-DC converter was generated from the position in FIG. 26, and the resulting electric field intensity was measured.

Figure 27:
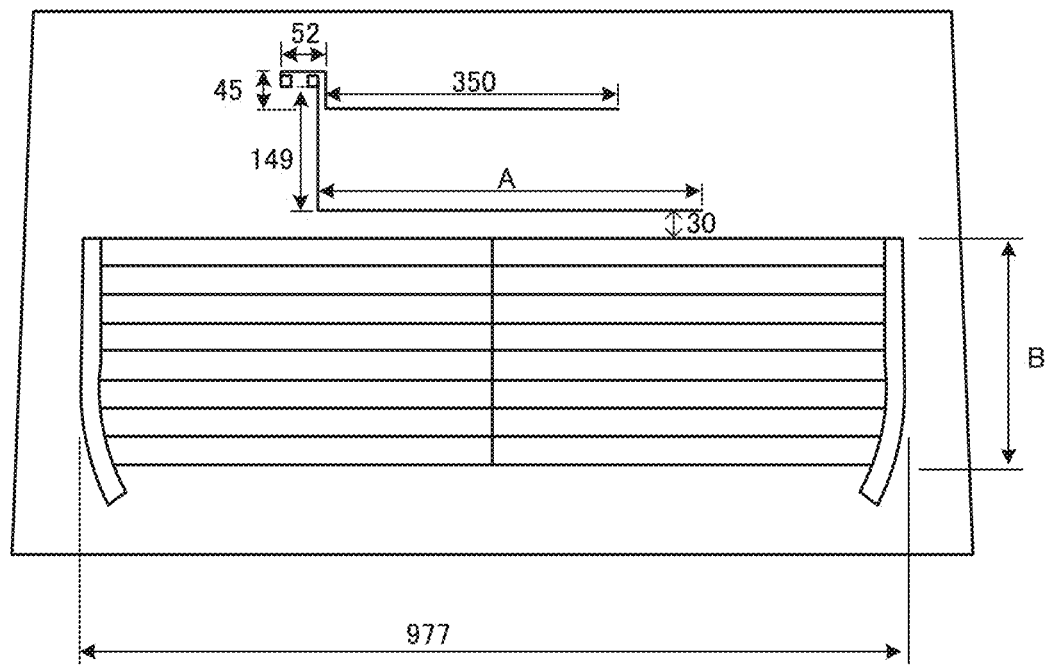
FIG. 27 is a front view of the rear window according to a comparative example of Example F.

A window with no noise suppression element as illustrated in FIG. 27 was prepared as a comparative example.

<5-1. Adjustment of Length A>

First, the horizontal length A of the antenna body element of the FM antenna element was adjusted. Here, length B=312 mm, length C=100 mm, and length D=400 mm.

Figure 28:
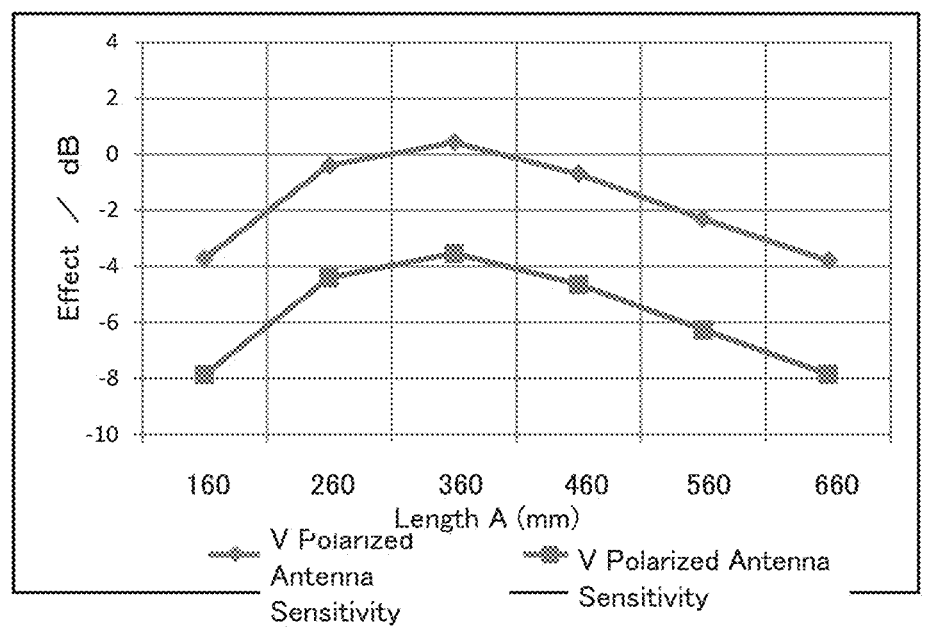
FIG. 28 is a graph illustrating sensitivity when changing length A in Example F (domestic FM band)
Figure 29:
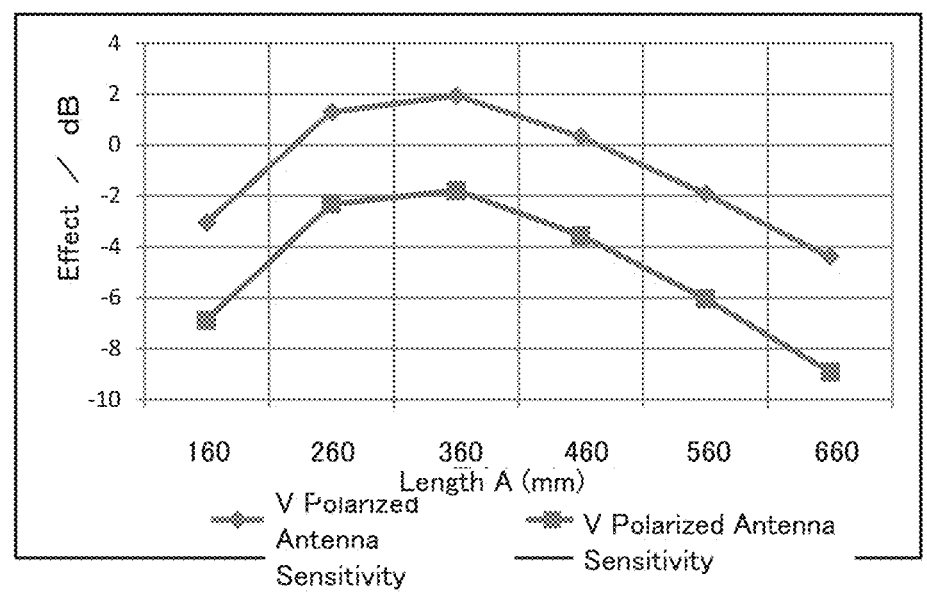
FIG. 29 is a graph illustrating sensitivity when changing length A in Example F (overseas FM band)

While adjusting the length A, the average value of V polarized antenna sensitivity and vehicle interior electric field intensity from the DC-DC converter were measured. FIG. 28 is a graph illustrating the average value in the domestic FM band of 70 to 90 MHz. FIG. 29 is a graph illustrating the average value in the overseas FM band of 88 to 108 MHz under the same conditions. The sensitivity in the vertical axis represents the difference from the sensitivity in the comparative example being set to 0. The same applies to the following description.

As illustrated in FIG. 28, in the domestic FM band, providing the noise suppression element resulted in lower vehicle interior electric field intensity than the comparative example even when changing the length A. This indicates that radiation noise from the DC-DC converter can be suppressed. When the length A was 360 mm, the FM wave reception sensitivity from outside the vehicle was improved as compared with the comparative example.

As illustrated in FIG. 29, even in the overseas FM band, providing the noise suppression element resulted in lower vehicle interior electric field intensity than the comparative example even when changing the length A. When the length A was 260 to 460 mm, the reception sensitivity of FM waves from outside the vehicle was improved compared with the comparative example.

<5-2. Adjustment of Length B>

Figure 30:
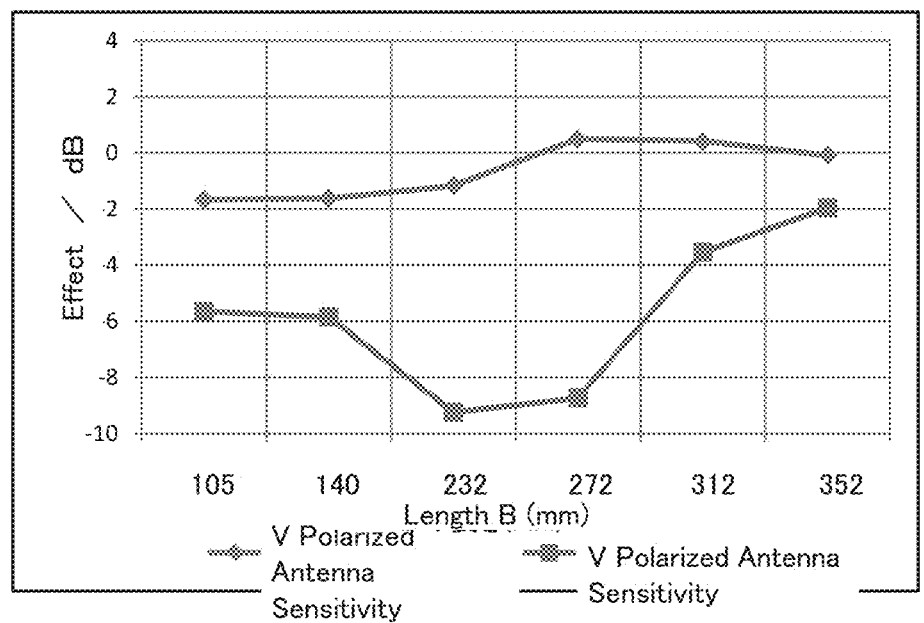
FIG. 30 is a graph illustrating sensitivity when changing length B in Example F (domestic FM band)
Figure 31:
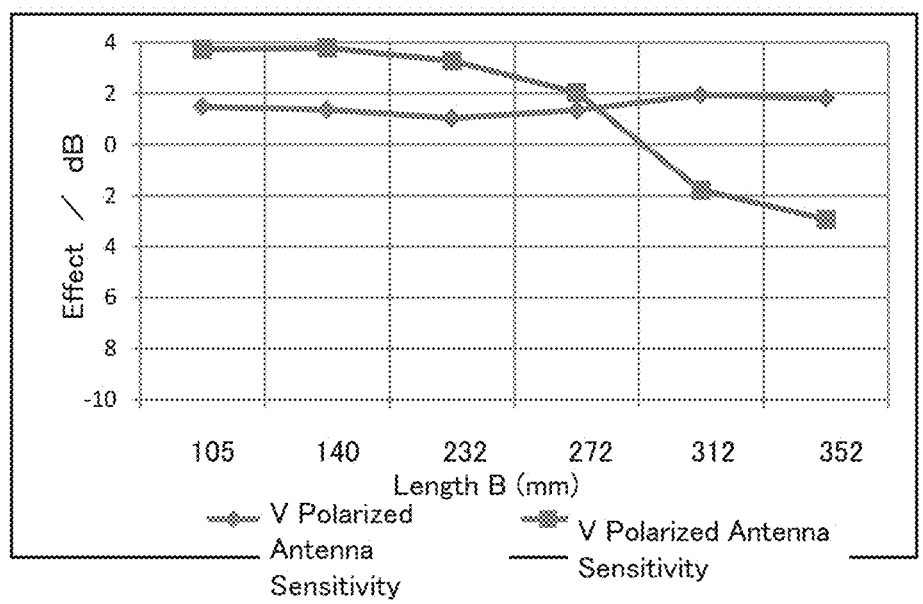
FIG. 31 is a graph illustrating sensitivity when changing length B in Example F (overseas FM band)

Next, the vertical length B of the defogger, i.e. the distance between the FM antenna element and the noise suppression element, was adjusted. Here, length A=360 mm, length C=100 mm, and length D=400 mm. While adjusting the length B, the average value of V polarized antenna sensitivity and vehicle interior electric field intensity from the DC-DC converter were measured. FIG. 30 is a graph illustrating the average value in the domestic FM band of 70 to 90 MHz. FIG. 31 is a graph illustrating the average value in the overseas FM band of 88 to 108 MHz under the same conditions.

As illustrated in FIG. 30, in the domestic FM band, providing the noise suppression element resulted in lower vehicle interior electric field intensity than the comparative example even when changing the length B. Particularly when the length B was 232 to 272 mm, the vehicle interior electric field intensity was lower than when the length B was not 232 to 272 mm. When the length B was more than 272 mm, the reception sensitivity of FM waves from outside the vehicle was mostly improved compared with the comparative example.

As illustrated in FIG. 31, in the foreign FM band, when the length B was 312 mm or more, the vehicle interior electric field intensity was lower than that in the comparative example. The FM wave reception sensitivity of FM waves from outside the vehicle was improved as compared with the comparative example, regardless of the value of the length B.

<5-3. Adjustment of Length C>

Figure 32:
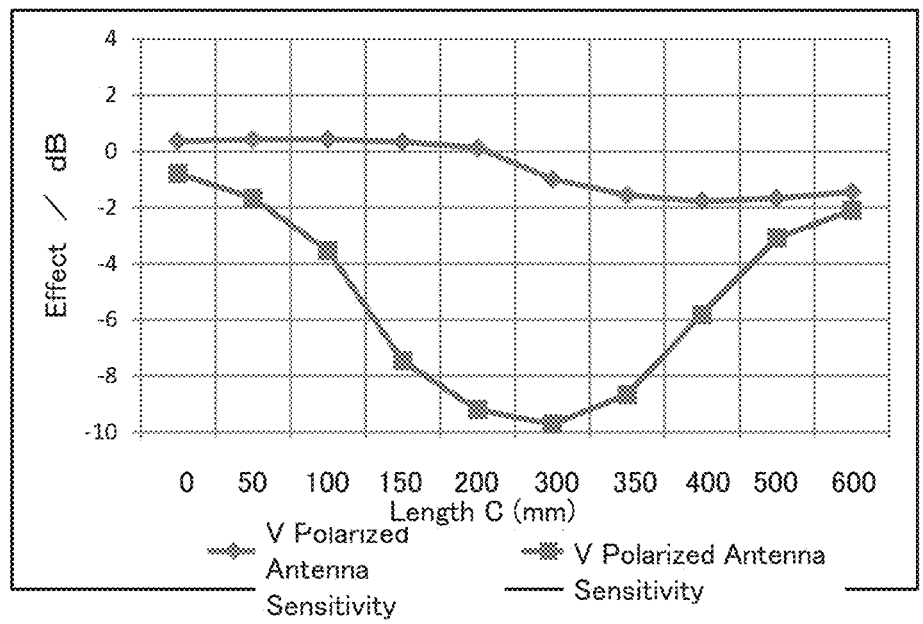
FIG. 32 is a graph illustrating sensitivity when changing length C in Example F (domestic FM band)
Figure 33:
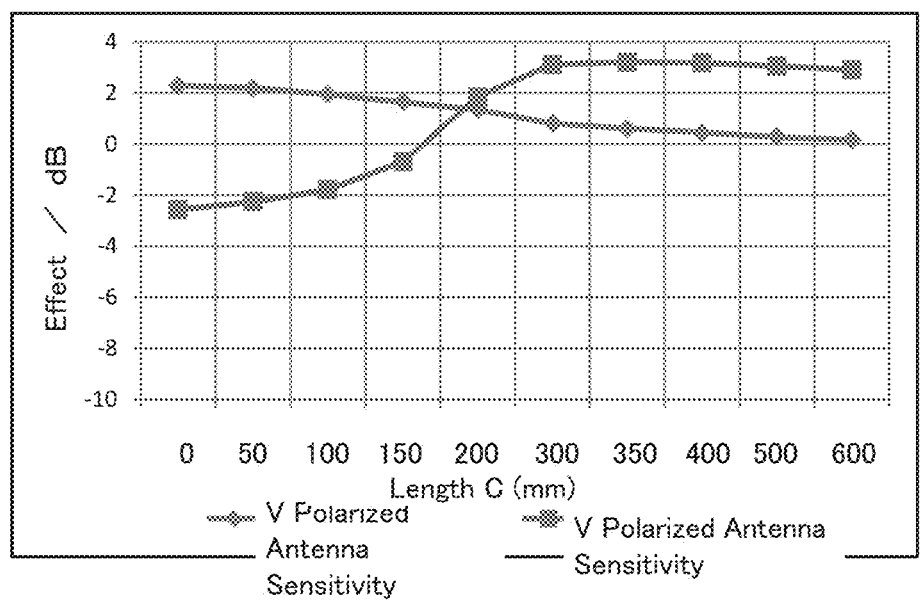
FIG. 33 is a graph illustrating sensitivity when changing length C in Example F (overseas FM band)

Next, the length C of the first portion of the noise suppression element was adjusted. Here, length A=360 mm, length B=312 mm, and length D=400 mm. While adjusting the length C, the average value of V polarized antenna sensitivity and vehicle interior electric field intensity from the DC-DC converter were measured. FIG. 32 is a graph illustrating the average value in the domestic FM band of 70 to 90 MHz. FIG. 33 is a graph illustrating the average value in the overseas FM band of 88 to 108 MHz under the same conditions.

As illustrated in FIG. 32, in the domestic FM band, providing the noise suppression element resulted in lower vehicle interior electric field intensity than the comparative example even when changing the length C. Particularly when the length C was 150 to 350 mm, the vehicle interior electric field intensity was lower than when the length C was not 150 to 350 mm. When the length C was less than 200 mm, the reception sensitivity of FM waves from outside the vehicle was mostly improved compared with the comparative example.

As illustrated in FIG. 33, in the foreign FM band, when the length B was 150 mm or less, the vehicle interior electric field intensity was lower than that in the comparative example. The reception sensitivity of FM waves from outside the vehicle was improved as compared with the comparative example, regardless of the value of the length C.

<5-4. Adjustment of Length D>

Figure 34:
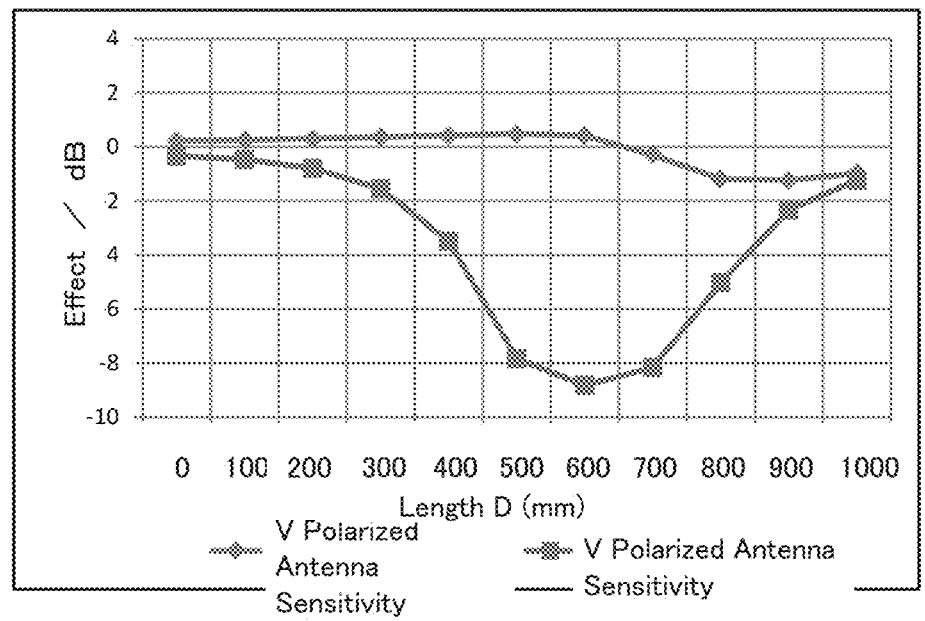
FIG. 34 is a graph illustrating sensitivity when changing length D in Example F (domestic FM band)
Figure 35:
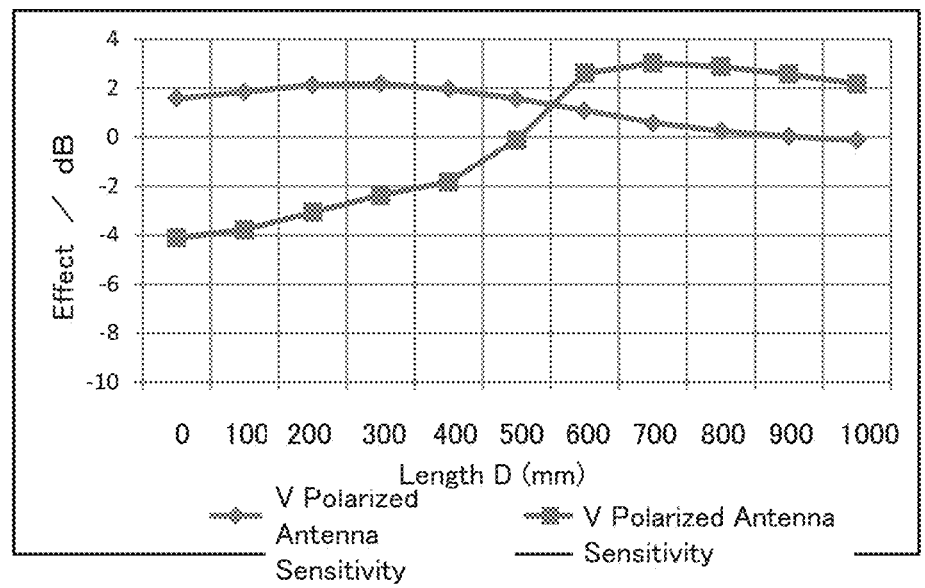
FIG. 35 is a graph illustrating sensitivity when changing length D in Example F (overseas FM band)

Next, the length D of the second portion of the noise suppression element was adjusted. Here, length A=360 mm, length B=312 mm, and length C=100 mm. While adjusting the length D, the average value of V polarized antenna sensitivity and vehicle interior electric field intensity from the DC-DC converter were measured. FIG. 34 is a graph illustrating the average value in the domestic FM band of 70 to 90 MHz. FIG. 35 is a graph illustrating the average value in the overseas FM band of 88 to 108 MHz under the same conditions.

As illustrated in FIG. 34, in the domestic FM band, the provision of the noise suppression element resulted in lower vehicle interior electric field intensity than the comparative example even when changing the length D. Particularly when the length D was 500 to 700 mm, the vehicle interior electric field intensity was lower than when the length D was not 500 to 700 mm. When the length D was less than 600 mm, the reception sensitivity of FM waves from outside the vehicle was mostly improved compared with the comparative example.

As illustrated in FIG. 35, in the foreign FM band, when the length B was 500 mm or less, the vehicle interior electric field intensity was lower than that in the comparative example. The reception sensitivity of FM waves from outside the vehicle was improved compared with the comparative example, regardless of the value of the length D.

6. Example G

Example G is described below. Example G is merely an example, and does not limit Invention 5.

The shape of the noise suppression element was changed to examine its effect. A window illustrated in FIG. 25 was prepared as Example 14. Other Examples 13 and 15 to 19 were prepared by changing the shape of the noise suppression element in FIG. 25 into the form illustrated in FIG. 18, as indicated by the following table. In each noise suppression element, the length of the first portion was 100 mm, and the length of the second and third portions was 200 mm. The antenna sensitivity was measured. In addition, an electric field such as one corresponding to the DC-DC converter was generated from the position in FIG. 26, and the resulting vehicle interior electric field intensity was measured. A window with no noise suppression element as illustrated in FIG. 27 was prepared as a comparative example.

TABLE 5

Figure 25:
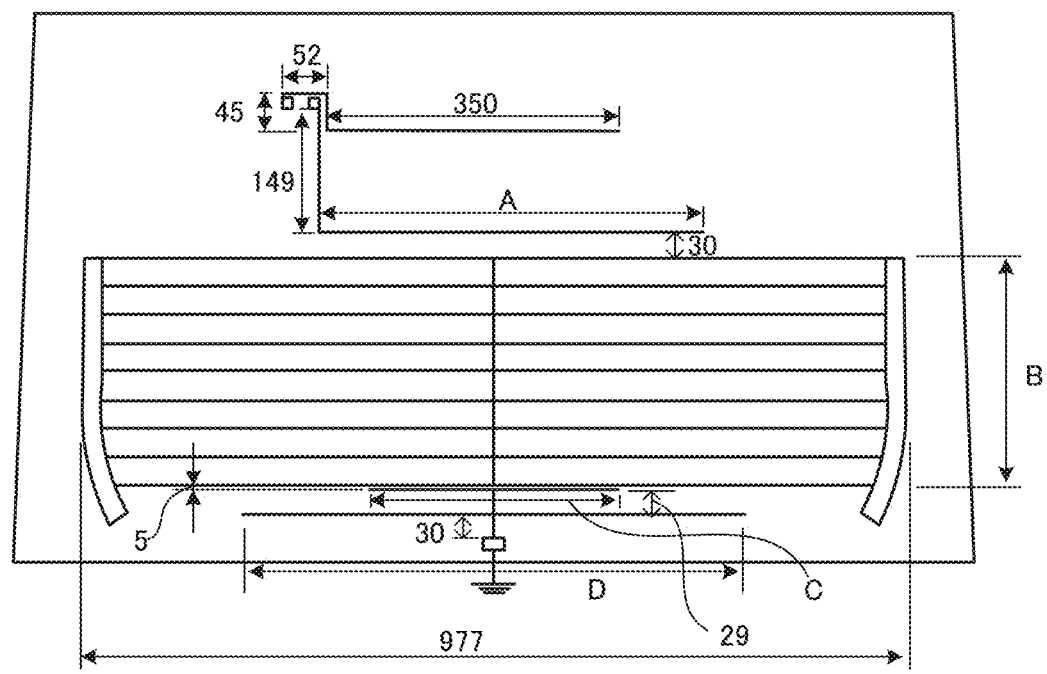
FIG. 25 is a front view of the rear window according to Example F.
Figure 26:
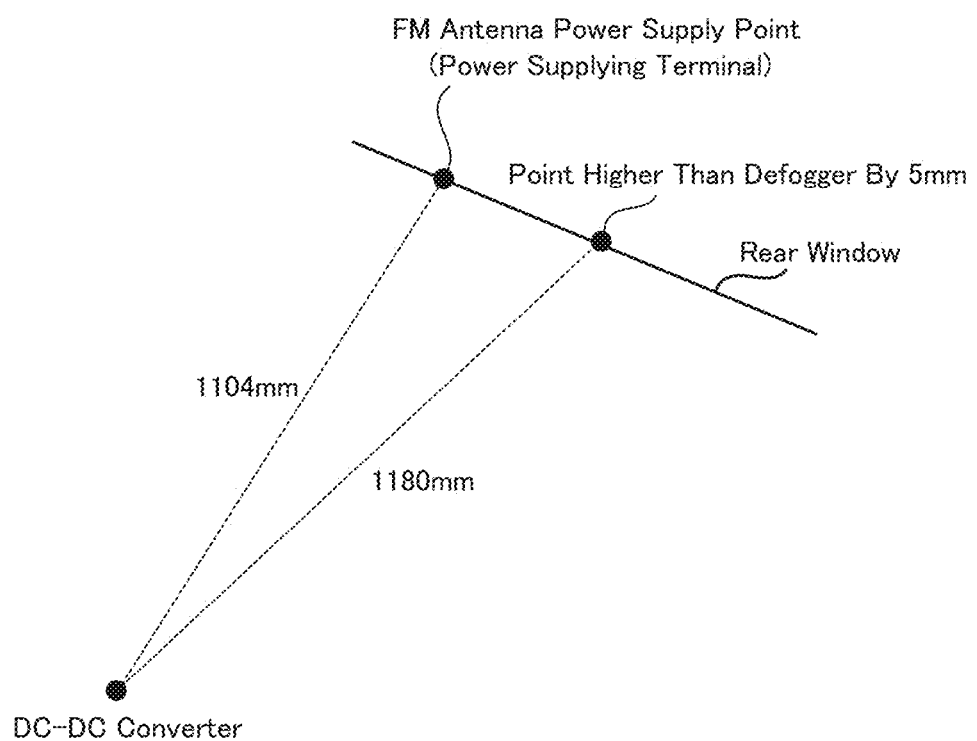
FIG. 26 is a sectional view illustrating the positional relationship between the rear window and the DC-DC converter.

| Example 13 | FIG. 19(a) |
| Example 14 | FIG. 25 |
| Example 15 | FIG. 19(b) |
| Example 16 | FIG. 19(c) |
| Example 17 | FIG. 19(d) |
| Example 18 | FIG. 19(e) |
| Example 19 | FIG. 19(f) |

Figure 36:
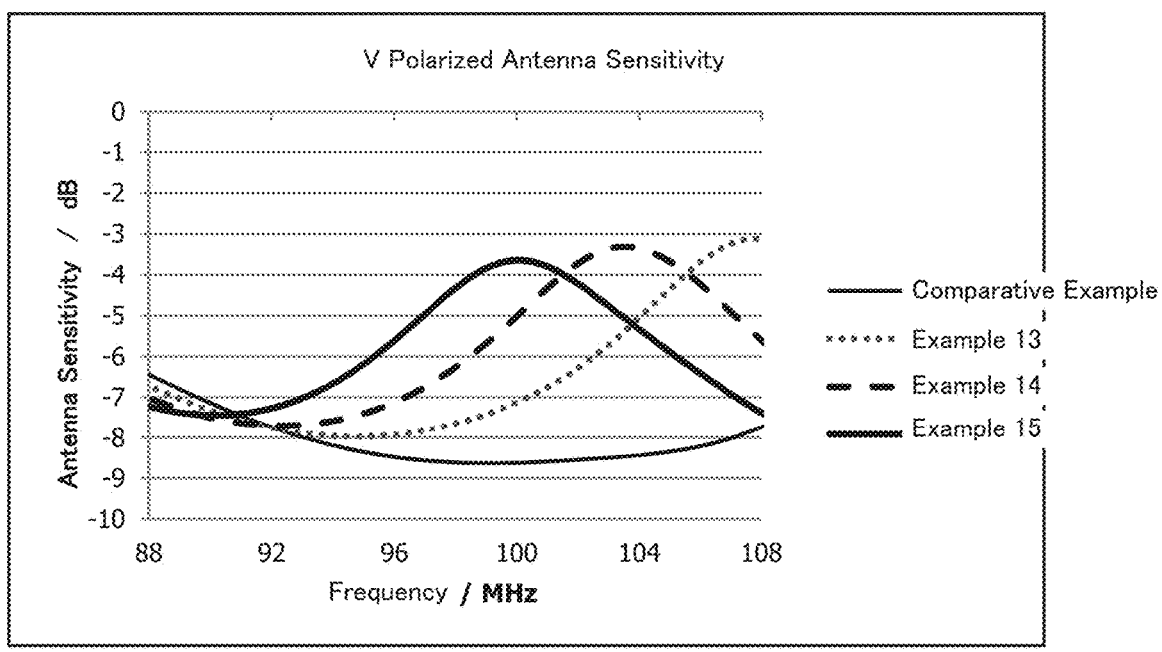
FIG. 36 is a graph illustrating sensitivity in Examples 13 to 15.
Figure 37:
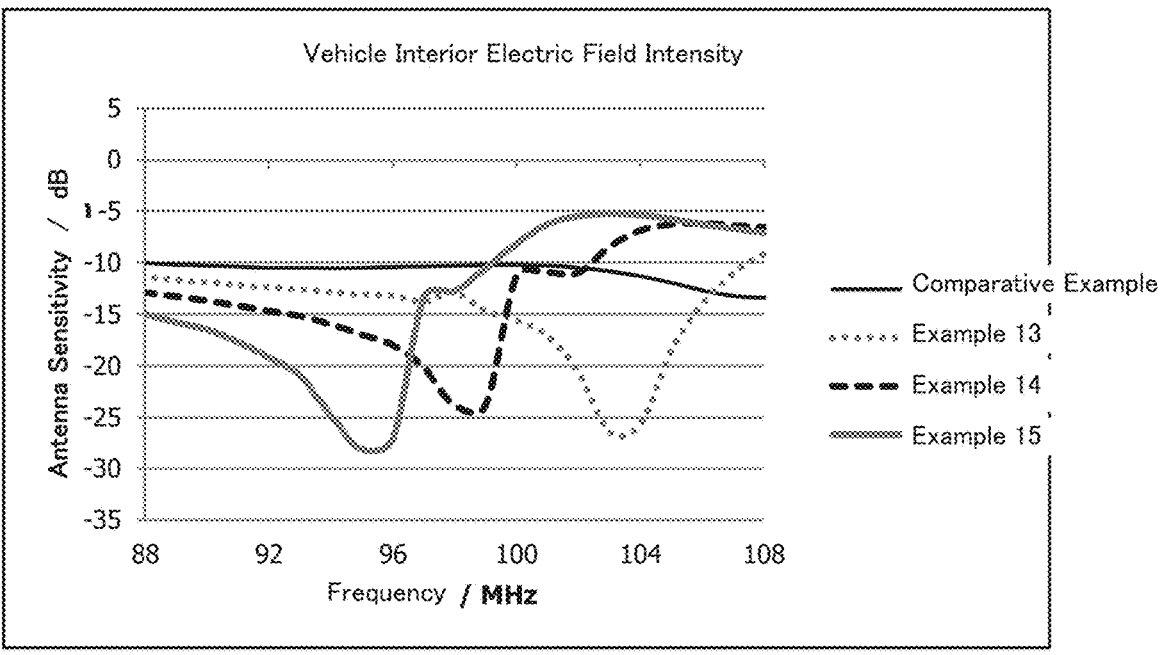
FIG. 37 is a graph illustrating vehicle interior electric field intensity in Examples 13 to 15.

First, the number of horizontally extending elements of the noise suppression element was examined. FIGS. 36 and 37 illustrate the results. As illustrated in FIG. 36, Examples 13 to 15 had higher reception sensitivity to FM waves from outside than the comparative example in approximately the whole frequency band. In particular, when the number of horizontally extending elements was smaller, the reception sensitivity in the high frequency region was higher.

As illustrated in FIG. 37, substantially all examples had lower vehicle interior electric field intensity from the DC-DC converter than the comparative example. Particularly in Example 13 with a smaller number of elements, the vehicle interior electric field intensity was lower than the comparative example throughout the whole frequency band. Moreover, when the number of horizontally extending elements was larger, the vehicle interior electric field intensity in the low frequency region was lower.

Figure 38:
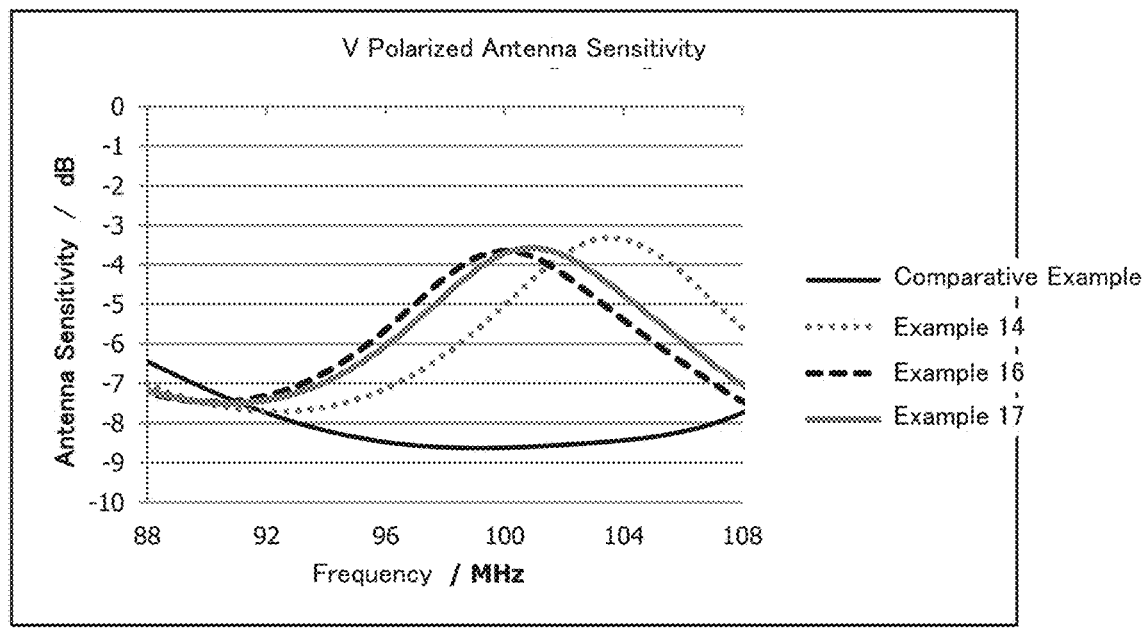
FIG. 38 is a graph illustrating sensitivity in Examples 14, 16, and 17.
Figure 39:
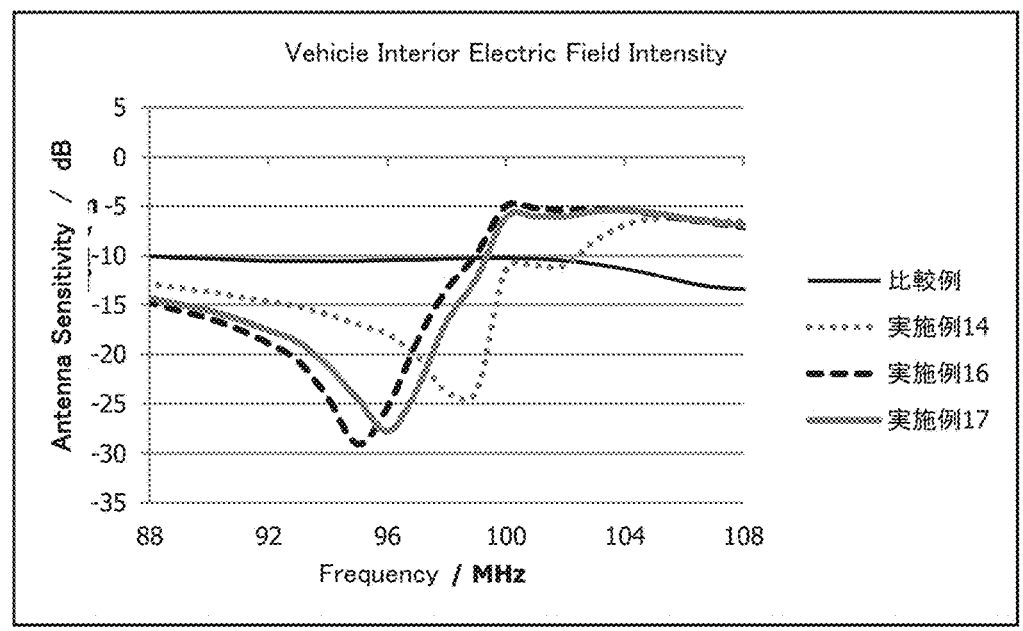
FIG. 39 is a graph illustrating vehicle interior electric field intensity in Examples 14, 16, and 17.

Next, the case where the number of horizontally extending elements of the noise suppression element was two was examined. FIGS. 38 and 39 illustrate the results. As illustrated in FIG. 38, Examples 14, 16, and 17 all had higher reception sensitivity to FM waves from the outside than the comparative example in approximately the whole frequency band. In particular, in Example 14 without the fifth portion at both ends, the reception sensitivity in the high frequency region was higher.

As illustrated in FIG. 39, Examples 14, 16, and 17 had lower vehicle interior electric field intensity from the DC-DC converter than the comparative example mostly in the low frequency region. Particularly in Example 14 without the fifth portion, the vehicle interior electric field intensity was lower than the comparative example except in the high frequency region. Examples 16 and 17 showed substantially the same results. This indicates that the presence or absence of the center vertical element does not significantly influence the sensitivity.

Figure 40:
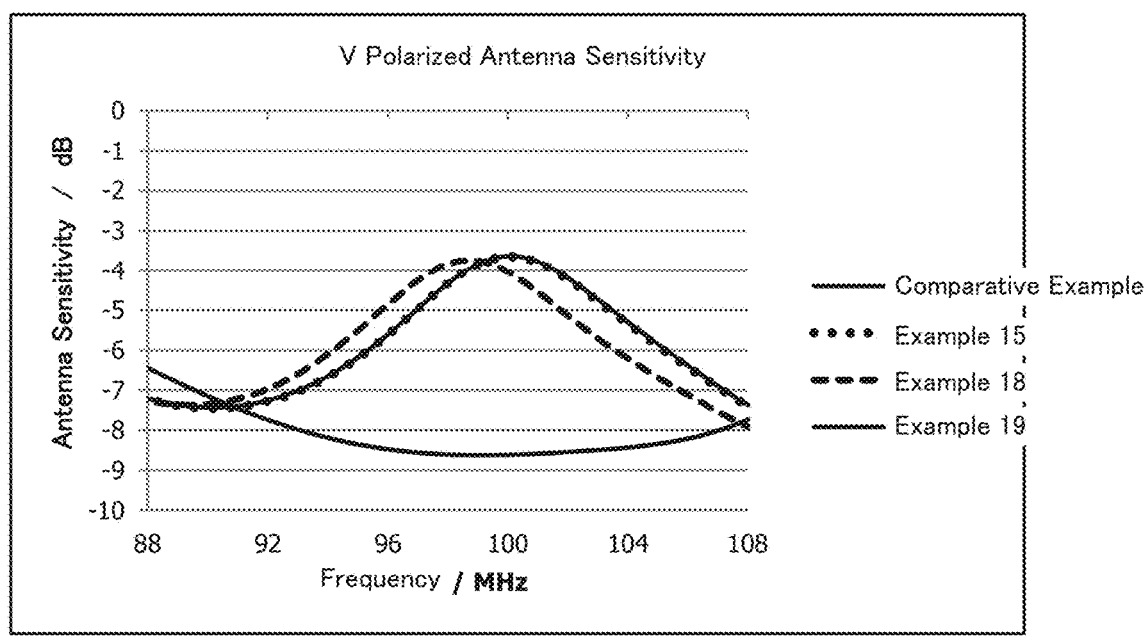
FIG. 40 is a graph illustrating sensitivity in Examples 15, 18, and 19.
Figure 41:
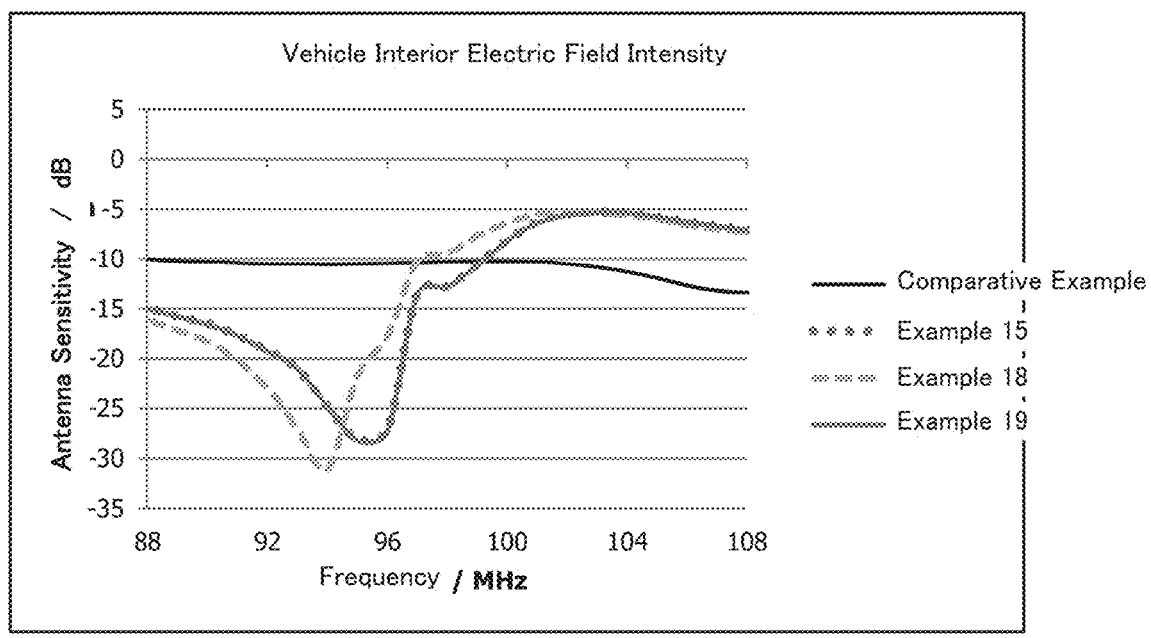
FIG. 41 is a graph illustrating vehicle interior electric field intensity in Examples 15, 18, and 19.

Next, the case where the number of horizontally extending elements of the noise suppression element was three was examined. FIGS. 40 and 41 illustrate the results. As illustrated in FIG. 40, Examples 15, 18, and 19 all had higher reception sensitivity to FM waves from the outside than the comparative example in approximately the whole frequency band.

As illustrated in FIG. 41, Examples 15, 18, and 19 had lower vehicle interior electric field intensity from the DC-DC converter than the comparative example mostly in the low frequency region. Examples 15 and 19 showed substantially the same results. This indicates that the presence or absence of the sixth portion does not significantly influence the sensitivity.

LIST OF REFERENCE NUMERALS 1 rear window
2 FM antenna element
3 defogger (heater)
31 horizontal element (heating wire)
F central frequency
S distance

The invention claimed is:

1. A glass antenna formed on a surface of a window of a motor vehicle including a device that transmits a radio wave in an FM band, the glass antenna comprising:
   an FM antenna element;
   a heater that is capacitively coupled to the FM antenna element, and includes a plurality of heating wires; and
   a noise suppression element located on a side of the heater opposite to the FM antenna element, and affecting noise from the device,
   wherein the heater includes at least one vertical element extending in a vertical direction, and
   the FM antenna element and the heater constitute an FM antenna reception unit.

2. The glass antenna according to claim 1, wherein a distance S between the FM antenna element and the heater is more than 40 mm.

3. The glass antenna according to claim 2, wherein the distance S is 50 mm or more.

4. The glass antenna according to claim 1,
   wherein the window is a rear window,
   the motor vehicle is a hybrid vehicle having an internal combustion engine and an electric motor as drive sources, and includes a driving battery for the electric motor, an auxiliary battery, and a DC-DC converter that converts a voltage of the driving battery into a voltage suitable for the auxiliary battery as the device,
   the DC-DC converter is located in a rear part of the motor vehicle, and
   a central frequency F of noise generated by driving the DC-DC converter satisfies 76 MHz≤F±7 MHz≤108 MHz.

5. The glass antenna according to claim 1, further comprising a plurality of noise rejection elements located between the FM antenna element and the heater, and including at least a horizontal element extending in a horizontal direction,
   wherein the plurality of noise rejection elements are arranged along the horizontal direction at a predetermined spacing.

6. The glass antenna according to claim 5, wherein the plurality of noise rejection elements are each connected to a vehicle ground.

7. The glass antenna according to claim 1, further comprising:
   an AM antenna element;
   a parallel resonance circuit that is formed by a pattern of an antenna wire connected to the AM antenna element, allows passage of a received signal in an AM broadcast frequency band, and blocks or attenuates a received signal in an FM broadcast frequency band.

8. The glass antenna according to claim 7, wherein the AM antenna element is located between the FM antenna element and the heater.

9. A hybrid vehicle having an internal combustion engine and an electric motor as drive sources, comprising:
   a rear window;
   a glass antenna according to claim 1, formed on a surface of the rear window,
   a driving battery for the electric motor,
   an auxiliary battery, and
   a DC-DC converter that converts a voltage of the driving battery into a voltage suitable for the auxiliary battery as the device,
   wherein the heater includes an anode bus bar connected to the auxiliary battery and supplies power to the heater, and a cathode bus bar connected to a vehicle ground,
   a noise filter for the FM antenna element is provided between the auxiliary battery and the anode bus bar, the noise filter including a coil element, and
   no noise filter is provided between the cathode bus bar and the vehicle ground.

10. The hybrid vehicle according to claim 9, wherein on the surface of the rear window, a power supplying terminal for supplying power to the FM antenna element is located on a cathode bus bar side.

* * * * *